United States Patent [19]

Stypula

[11] Patent Number: 5,202,138

[45] Date of Patent: Apr. 13, 1993

[54] STABLE PIZZA FOOD ARTICLE, PROCESS FOR PREPARING SAME AND COATING COMPOSITION USED IN SAME

[75] Inventor: Richard J. Stypula, Colts Neck, N.J.

[73] Assignee: International Flavors & Fragrances Inc., New York, N.Y.

[21] Appl. No.: 138,157

[22] Filed: Dec. 28, 1987

[51] Int. Cl.[5] .................. A23L 1/0522; A23L 1/0524; A23L 1/0526; A23P 1/08

[52] U.S. Cl. .................................... 426/94; 426/293; 426/296; 426/302; 426/303; 426/305

[58] Field of Search .................. 426/94, 302, 303, 305, 426/293, 296

[56] References Cited

U.S. PATENT DOCUMENTS

| | | | |
|---|---|---|---|
| 3,615,678 | 10/1971 | Tangel | 426/94 |
| 3,667,963 | 6/1972 | Katter et al. | 426/293 |
| 4,066,796 | 1/1978 | McKee | 426/302 |
| 4,283,431 | 8/1981 | Giordano et al. | 426/296 |
| 4,293,572 | 10/1981 | Silva et al. | 426/439 |
| 4,401,681 | 8/1983 | Dahle | 426/94 |
| 4,576,646 | 3/1986 | Branco et al. | 426/302 |
| 4,645,674 | 2/1987 | Lang et al. | 426/302 |
| 4,762,721 | 8/1988 | Holscher et al. | 426/302 |

FOREIGN PATENT DOCUMENTS 3224533 9/1987 Fed. Rep. of Germany.

OTHER PUBLICATIONS

Renz-Schauen and Renner, "Food Technology" Oct. 1987 vol. 41, No. 10, pp. 122, 123, 127.

Baker and O'Brien, Poultry Science, 1983, vol. 62, No. 4, pp. 621–630.

Primary Examiner—Jeanette Hunter
Assistant Examiner—Mary S. Mims
Attorney, Agent, or Firm—Arthur L. Liberman

[57] ABSTRACT

Described is a pizza food article having high shelf stability and having the advantage of avoidance of etching of oil through the dough. The invention also contemplates multi-layer pizza dough-containing pizza articles.

19 Claims, 11 Drawing Sheets

FIG. 20
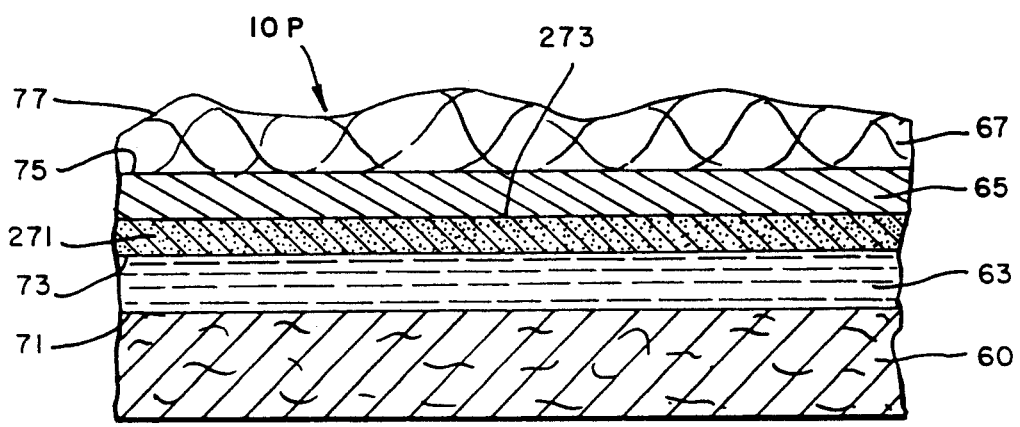
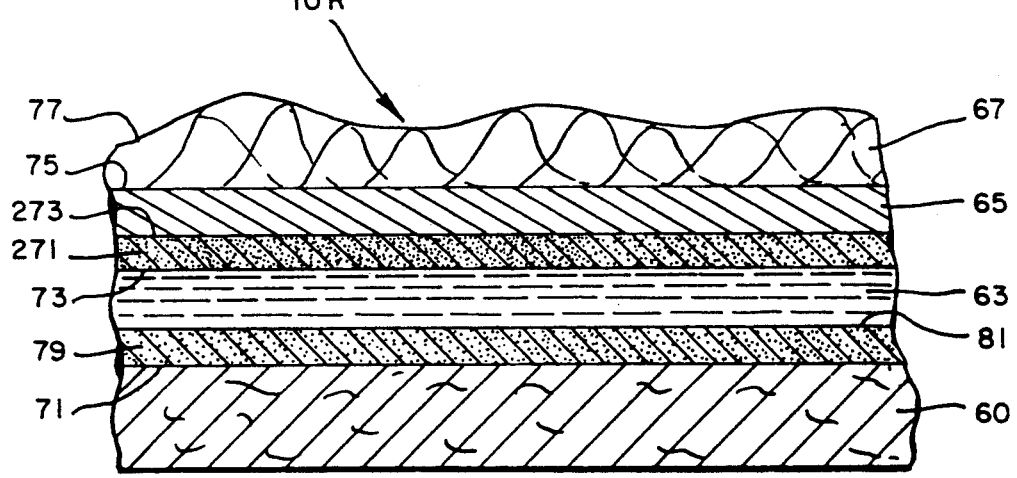
FIG. 21

STABLE PIZZA FOOD ARTICLE, PROCESS FOR PREPARING SAME AND COATING COMPOSITION USED IN SAME

BACKGROUND OF THE INVENTION

The preparation of pizza pies has required a considerable expenditure of manual labor particularly the preparation of shelf-stable pizza pies and the preparation of pizza pies which avoid the etching of oils and sauces through the outer crust surface on cooking. Efforts have been made to improve the efficiency of production of such pizza food articles and to reduce their cost in general.

Various complicated apparatus configurations, for example, those of U.S. Pat. No. 4,649,053 issued on Mar. 10, 1987 and U.S. Pat. No. 4,381,317 issued on Apr. 26, 1983 exist in the prior art and have been created in an effort to provide finished pizza articles having high shelf stabilities.

Baker and O'Brien, Poultry Science, 1983, Volume 62, No. 4, at pages 621–630 discloses a pre-cooked frozen egg-based pizza using a number of crust formulations containing 70–85% egg albumen. Baker and O'Brien showed that various texture improving ingredients (e.g., wheat flour, corn oil, milk solids, sodium caseinate and sweet dairy whey or heavy white sauce); and italian seasonings may be used in the pizza dough. In the Baker and O'Brien article acceptability was tested with objective measurements including moisture loss and shear values and subjective measurements, e.g., sensory evaluation. Results of such objective tests in the Baker and O'Brien article showed that inclusion of 13.3% wheat flour with or without 5% corn oil minimized moisture loss without addition of moisture holding additives such as xanthan gum or sodium carboxymethyl cellulose (CMC). Baker and O'Brien showed that shear values of flour-containing albumen formulations were greater than those of other egg-based formulations. In the Baker and O'Brien article it is indicated that taste panelists preferred the albumen-flour crust over other egg bases because they were texturally more like conventional flour based pizza crusts. The Baker and O'Brien article further indicated that sensory evaluation with both semi-trained and consumer panelists rated egg pizzas as good as or better than commercially available frozen flour based cheese pizzas. My invention is directed to both egg-based pizza crust-containing pizzas and non-egg products.

Giordano in U.S. Pat. No. 4,283,431 discloses a double layered pizza-type product prepared by:
(i) applying at least one layer of ingredients, including tomato sauce, to a pre-baked pastry layer;
(ii) distributing a blend of cheese (e.g., mozzarella and/or provolone) over the layer;
(iii) stretching a second layer of rolled out, unbaked pastry over the entire cheese layer;
(iv) partially baking the two pastry layers with the ingredient layers sandwiched therebetween;
(v) allowing the product to cool;
(vi) applying to the second pastry layer a further layer of ingredients; and
(vii) baking the product to completion.

My invention covers in addition to pizza products containing single pizza dough layers, pizza products containing multiple-dough layers, for example, the configuration of Giordano, U.S. Pat. No. 4,283,431. Quick Frozen Foods, 1980, Volume 42, No. 12, at pages 33, 34, 36, 38, 39, 40 and 42 describes frozen pizza production at Dadco Food Products, Black River Falls, Wis. and indicates a technique for production of such frozen pizza. My invention contemplates the application of specific novel coating compositions to the various laminas of such pizzas as shown in the Quick Frozen Foods article.

German Offenlegungsschrift 3,224,533 assigned to Freiberger Lebensmi. and published on Sep. 10, 1987 has the following disclosure:

Pizza bottoms for a deep frozen programme are partly baked after dough raising at a temp. of over 120 deg. C, in surface contact with a liq. baking substance (oil) which is sprayed on the surface of the dough. This spraying operation takes place before the partial baking and at a temp. below this pre-baking temp. The final baking is only done just before consumption.

ADVANTAGE—This requires less baking oil so that a less fatty pizza is produced and the crusty surface and fine pores make the pizza better eatable. (4pp)

SUMMARY OF THE INVENTION

In general, my invention is directed to:
(a) a pizza dough lamina having a first pizza dough lamina surface and a second pizza dough lamina surface;
(b) a substantially continuous tomato sauce composition lamina having a substantially horizontal planar upper tomato sauce composition lamina surface and a substantially horizontal planar lower tomato sauce composition lamina surface; and
(c) a cheese composition lamina having a substantially planar cheese composition lamina upper surface and a substantially planar cheese composition lamina lower surface; and, optionally,;
(d) a condiment coating having a lower condiment surface and an upper condiment surface;
and coated on one or more of the surfaces of the pizza dough lamina, the tomato sauce composition lamina surfaces, the cheese composition lamina surfaces and/or the condiment composition surfaces, a coating which is either:

I.
  (i) from 5 up to 20% whey protein concentrate;
  (ii) from 30 up to 60% water;
  (iii) from 0.4 up to 3% of a cellulose derivative selected from the group consisting of lower alkoxy celluloses, hydroxy lower alkoxy celluloses and acyloxy celluloses;
  (iv) from 20 up to 50% unsaturated edible oil, e.g., coconut oil, corn oil, olive oil, lard; and
  (v) from 0.2% up to 1% of an emulsifier, e.g., a TWEEN ® or a SPAN ®; and
  (vi) optionally, from 1 up to 8% of a starch polysaccharide or
II.
  (i) from 40 up to 75% of a starch polysaccharide;
  (ii) from 5 up to 20% of a cellulose derivative selected from the group consisting of lower alkoxy celluloses, hydroxy lower alkoxy celluloses and acyloxy celluloses;
  (iii) from 0.05 up to 0.5% by weight of a gum;

(iv) from 8% up to 20% by weight of a salt composition; and (v) from 9 up to 20% by weight of a sugar, e.g., sucrose.

More specifically, my invention contemplates a method for producing an edible pizza food article comprising the steps of:

(a) applying a continuous layer of a first coating composition as defined, supra to a thermally conductive or non-conductive substantially horizontally planar solid surface (e.g., a metal surface or a refractory surface) thereby forming a first coating lamina having a substantially horizontally planar coating composition lamina surface;

(b) applying a continuous layer of pizza dough to said first coating lamina thereby forming a first pizza dough lamina having a substantially horizontally planar pizza dough lamina surface;

(c) applying at least one substantially continuous layer of a tomato sauce composition to substantially the entirety of the pizza dough lamina surface thereby forming a tomato sauce composition lamina having a substantially horizontally planar upper tomato sauce composition lamina surface;

(d) applying at least one cheese composition (e.g., mozzarella, parmesan and/or provolone taken alone or in combination) to substantially the entirety of said upper tomato sauce composition lamina surface thereby forming a cheese composition lamina having a substantially horizontally planar cheese composition lamina surface; and (e) baking the product to completion either from under the article to be baked when the coating is on a metal surface or from above by means of microwave cooking and the like when the article is resting on a refractory surface.

In the alternative, in addition to the coating being on the outer surface of the pizza dough lamina, additional coatings can be applied to the inner surface of the pizza dough lamina; and/or to the upper surface of the tomato sauce composition lamina; and/or to the upper surface of the cheese composition lamina.

Furthermore, as is well known in the prior art, the pizza article can have applied to the upper surface of the cheese composition lamina, a condiment coating, e.g., olives, mushrooms, prosciutto, sausages, broccoli and the like. Optionally, applied to the condiment "layer" an additional coating composition described, supra, may be applied.

In the alternative, coatings can the applied to the surfaces as stated, supra, but without application to the bottom layer of the pizza dough lamina; and this is the case that is preferred when a "thin" rather than a "thick" dough layer is used as the base layer of the pizza article.

Preferably, the pizza dough is in the form of a "yeast-risen" dough; that is, flour, water and yeast are initially admixed and the resulting dough is permitted to rise and is then stretched prior to application to a pan or refractory material that is either coated or not coated with the above composition. As stated, supra, the dough can also be admixed with egg albumen as specified in Poultry Science, 1983, 62(4), at pages 621-30.

In the alternative, the pizza configuration can be of the type disclosed in U.S. Pat. No. 4,283,431 (the specification for which is incorporated by reference herein). In the configuration of U.S. Pat. No. 4,283,431 a double layered pizza type product is prepared by:

(i) applying at least one layer of ingredients including tomato sauce to a pre-baked pastry layer;

(ii) distributing a blend of mozzarella and provolone cheese over the layer;

(iii) stretching a second layer of rolled out unbaked pastry over the entire cheese layer;

(iv) partially baking the two pastry layers with the ingredient layer sandwiched therebetween;

(v) allowing the product to cool;

(vi) applying to the second pastry layer a further layer of ingredients; and (vii) baking the product to completion.

In practicing my invention with respect to the disclosure of U.S. Pat. No. 4,283,431 one of the coatings as set forth, supra, a "first" coating is first applied to a solid surface. Then the pastry layer is applied to the coating on the solid surface; then at least one layer of ingredients including tomato sauce is applied to the first pastry layer; optionally, a coating can be applied to the tomato sauce or to the upper surface of the pre-baked pastry layer. A blend of cheese is then placed over the tomato layer; optionally, one of the coatings defined, supra, may be applied to the cheese layer. Then a second layer of rolled out, unbaked pastry is applied to the entire cheese layer; optionally, one of the coatings set forth, supra, may be applied to the second layer of rolled out, unbaked pastry. The two pastry layers are then partially baked with the ingredient layers and coatings (optionally) sandwiched there between. The product is allowed to cool and to the second pastry layer a further layer of ingredients is applied. Optionally, to the further layer of ingredients, e.g., anchovies, olives, mushrooms, sausage, provolone and the like additional coating as defined, supra, is applied. The product is then baked to completion. With respect to the coatings, the gum used in the coating may be xanthan gum, carrageenan gum, gum tragacanth, karaya gum, guar gum, locust bean gum or the like. The xanthan gum has the structure:

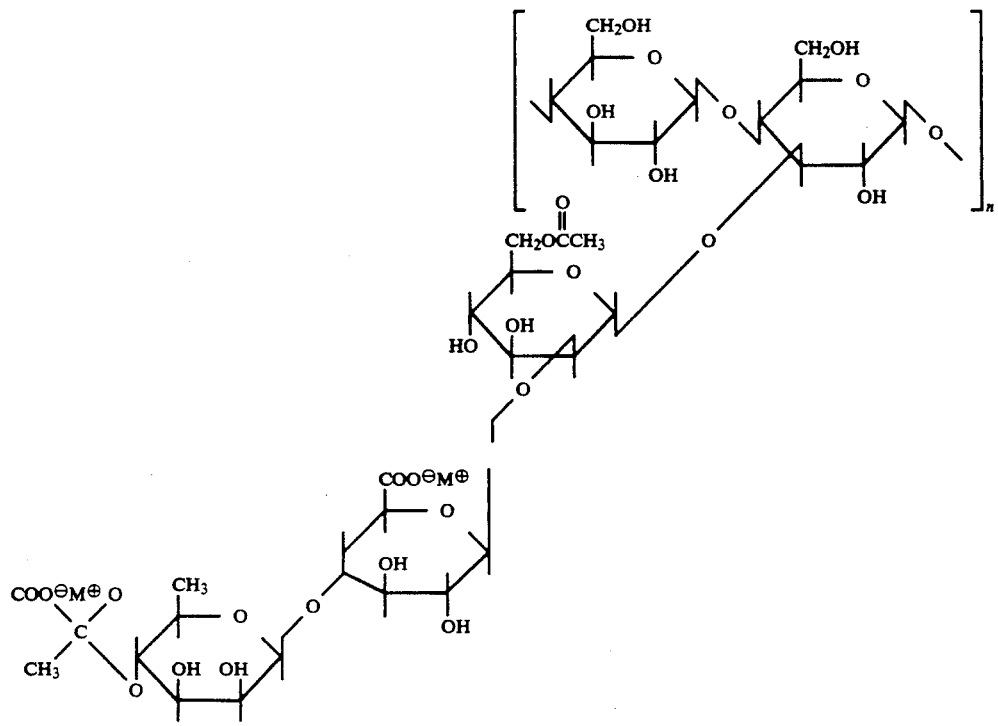

wherein n is indicative of repeating units and M represents sodium, potassium and/or ½ calcium (the calcium ion being attracted to two repeating monomeric units as indicated above). Examples of xanthan gum are the KELTROL® brand of xanthan gums, e.g., KELTRO® F produced by the Kelco Organization of Okmulgee, Okla. The place of the aforementioned gum such as xanthan gum or in addition to the aforementioned gums such as xanthan gum, microcrystalline cellulose and Furcellaran may be utilized.

The cellulose derivative in the coatings may be an alkoxy cellulose such as methylcellulose having the structure:

for example, METHOCEL® A produced by the Dow Chemical Company of Midland, Mich.) wherein n represents a repeating monomeric unit; hydroxypropylcellulose having the structure:

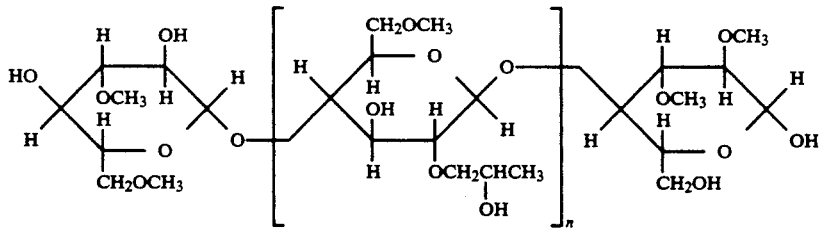

wherein n represents a repeating monomeric unit, for example, METHOCEL® E, METHOCEL® F, METHOCEL® J or METHOCEL produced by the Dow Chemical Company of Midland, Mich. or KLUCEL® produced by the Hercules Corporation of Wilmington, Del.; or hydroxybutylmethylcellulose having the structure:

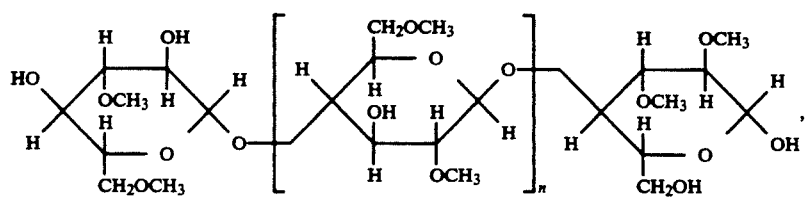

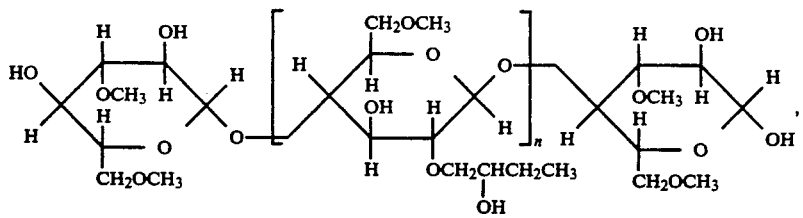

for example, METHOCEL® HB produced by the Dow Chemical Company of Midland, Mich. (wherein n represents a repeating monomeric unit). The number "n" in the foregoing cellulose derivatives' structures is a function of the particular viscosity (and thus, molecular weight) of the polymer used. The range of viscosity in centipoises may vary from about 10 up to about 100,000 and even higher. Other cellulose derivatives that may be used are acyloxy celluloses such as carboxymethylcellulose. The substances "hydroxypropylmethylcellulose" and "hydroxybutylmethylcellulose" are herein also termed "hydroxy lower alkyl celluloses".

The starch derivative that can be used in the coatings of my invention may be modified or non-modified starches. More specifically, starch products can be used which contain a large amount, e.g., 50% or more of so-called amylose having a linear configuration, such as high-amylose corn starch, fractionated amylose or the like. A starch containing higher percentage of amylose is useable in the barrier layer of my invention, unlike the starches used in U.S. Pat. No. 4,076,846, for example. However, the starch materials found to be useable in said U.S. Pat. No. 4,076,846 are also useable in my invention. These starch materials generally include various common type starches obtained from grain, potatoes, edible roots, etc. such as corn starch, wheat starch, potato starch, tapioca starch and the like which generally contain 50% by weight or less of amylose. Special type starches are also useable in the practice of my invention which contain 10% or less of amylose such as waxy corn strach and glutinous rice starch used further in combination with high amylose starches. Furthermore, so-called unmodified treated starches such as alpha-starch and dextrin may also be used. High amylose starches containing more than 50% by weight of amylose are generally special corn starch materials derived from an improved corn variety. The high amylose starch can be replaced by a so-called fractionated amylose containing 90% by weight or more of amylose which is obtained from common-type starches such as potato starch by fractionation or replaced by a mixture of fractionated amylose and other common-type starches. In addition, edible modified starch materials can be used in my invention including carboxymethyl starch, hydroxyethyl starch, hydroxypropyl starch, methyl starch, ethyl starch, methylhydroxyethyl starch, ethylhydroxypropyl starch, starch phosphate and the like.

Other starch products include instant thickened starch produced from pre-gelled starch/maltodextrin products as disclosed in the July 1987 is of "Food Processing" on page 68, for example, INSTA STARCH® manufactured by Zumbro Incorporated, Route 1, Box 83, Hayfield, Minn. 55940.

In addition, the coating of my invention may also include a polyolpolyester. Such materials are polyol fatty acid polyesters such as sucrose polyesters as described in U.S. Pat. No. 3,600,186 issued on Aug. 17, 1971; U.S. Pat. No. 3,954,976 issued on May 4, 1976; U.S. Pat. No. 4,241,054 issued on Dec. 23, 1980; U.S. Pat. No. 4,264,583 issued on Apr. 28, 1981; the specifications for which are incorporated by reference herein. Thus, European Application 132,941 describes the synthesis of higher polyol fatty acid polyesters using carbonate catalysts and includes the disclosure of sucrose fatty acid polyesters.

The gum used in the coating of my invention can also be prepared according to state of the art method such as that described in European Patent Application 207,032 published on Dec. 30, 1986 and abstracted at Chemical Abstracts, Volume 107, 1987, at No. 38351f. The teachings of this application giving rise to a guar gum flour can easily be incorporated into my invention and the guar gum flour thus produced according to the teachings of application 207,032 can be used as one of the "gums" of my invention in the barrier layer of my invention. European Application 207,032 relates to a process for preparing a product comprising guar gum present in the form of particles and possessing a sustained swelling in an aqueous suspension whereby guar gum flour is produced with a solution consisting of water:-solvent in the relationship of 60:40 up to 0:100 and comprising a compound of the group consisting of film forming fatty acids, film forming polymers and ethycellulose whereby the solvent is an organic solvent having the ability in dissolving the organic film forming compounds while creating particles or glomerates having a size of less than 3 mm but substantially above 0.5 mm. The guar gum flour is wetted with 28.5 kg water/isopropenyl azeotropic mixture (12:88) in which 0.18 kilograms ethylcelluloses dissolved. The guar flour is moisturized in a wet mixture, then fluidized bed-dried to less than 8% water and the fraction of desired particle size (0.5-3.0 mm) is sieved off.

The coating compositions of my invention can also contain alginates such as those alginates containing alpha-1,4 linked L-guluronic acid units having the structure:

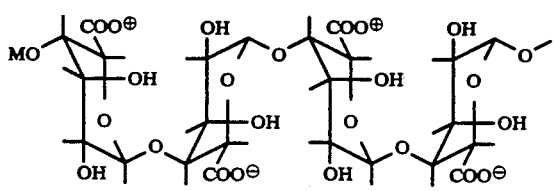

beta-1,4 linked D-mannuronic acid units having the structure:

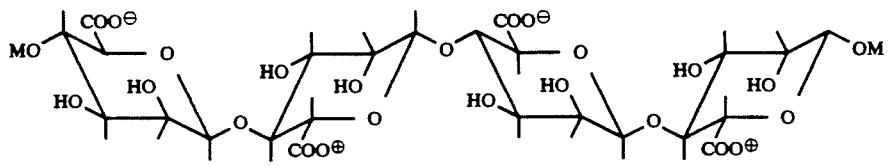

and alpha-1,4 linked D-galacturonic acid units having the structure:

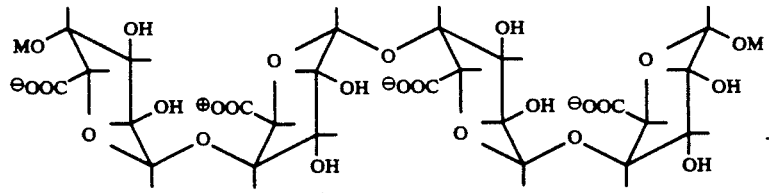

Such alginates may also be present in the form of calcium-algin complexes as described by Messina and Pate in "Food Engineering", April 1966, in the article entitled "Ingredient Cuts Heat Process Time/La Choy Foods' Algin Thickening System Keeps Product Consistency Low For Efficient Retorting, Permits Viscosity Increase After Processing". Sodium alginate, per se, or potassium alginate can also be used in the barrier coating and/or barrier composition of my invention.

The barrier layer and/or barrier composition of my invention can also contain proteinaceous substances such as milk proteins including alpha, beta and gamma caseins, and sodium and potassium caseinate.

The coatings of my invention can also contain whey protein concentrate or blends of whey protein concentrate and sodium caseinate, for example, the SAVORPRO® and SAVORLAC® products manufactured by Express Foods Company, Inc., 11001 Bluegrass Parkway, Suite 200, Louisville, Ky. 40299, for example:

TABLE I

| PRODUCT | DESCRIPTION |
| --- | --- |
| SAVORLAC ® 600 | A 34-36% PROTEIN BLEND OF WHEY, SODIUM CASEINATE |
| SAVORLAC ® 643 | A 18-22% PROTEIN BLEND OF WHEY, SODIUM CASEINATE |
| SAVORLAC ® 800 | A 34-36% PROTEIN BLEND OF WHEY, CALCIUM/SODIUM CASEINATE |
| SAVORLAC ® 853 | A 34-36% PROTEIN BLEND OF INSTANTIZED WHEY, CALCIUM/SODIUM CASEINATE |
| SAVORLAC ® 900 | A 34-36% PROTEIN BLEND OF WHEY, CALCIUM CASEINATE |
| SAVORLAC ® 931 | A 34-36% PROTEIN BLEND OF WHEY/CALCIUM CASEINATE |
| RESTOR ® 24A | A 36-40% PROTEIN BLEND OF SOY FLOUR, WHEY SOLIDS AND NONFAT DRY MILK |

TABLE II

| PRODUCT | DESCRIPTION |
| --- | --- |
| SAVORPRO ® 50 | A 50% MINIMUM PROTEIN WHEY PROTEIN CONCENTRATE |
| SAVORPRO ® 65 | A 62% MINIMUM PROTEIN WHEY PROTEIN CONCENTRATE |
| SAVORPRO ® 75 | A 75% MINIMUM PROTEIN WHEY PROTEIN CONCENTRATE |
| SAVORPRO ® 5015 | AN INSTANTIZED, 50% MINIMUM PROTEIN WHEY PROTEIN CONCENTRATE |
| SAVORPRO ® 7515 | AN INSTANTIZED, 74% MINIMUM PROTEIN WHEY PROTEIN CONCENTRATE |
| SAVORPRO ® 5004 | A LOW LACTOSE, 50% MINIMUM PROTEIN WHEY PROTEIN CONCENTRATE |
| SAVORPRO ® 7504 | A LOW LACTOSE, 75% MINIMUM PROTEIN WHEY PROTEIN CONCENTRATE |
| SAVORPRO ® 5001 | A HIGH CALCIUM, 50% MINIMUM PROTEIN WHEY PROTEIN CONCENTRATE |
| SAVORPRO ® 7501 | A HIGH CALCIUM, 75% MINIMUM PROTEIN WHEY PROTEIN CONCENTRATE |
| SAVORPRO ® 7502 | A HIGH GEL STRENGTH 75% MINIMUM PROTEIN WHEY PROTEIN CONCENTRATE. |

The use of whey protein concentrates directly blended in with dough itself is disclosed in the article by Anna Renz-Schauen and Edmund Renner, Food Technology, Volume 41, No. 10, October 1987 the disclosure of which is incorporated herein by reference. Indeed, the various whey protein concentrates disclosed in the Renz-Schauen and Renner article and references cited therein, to wit:

Abrahamsson, L. Forsum, E., and Hambraeus, L. 1974;
Forsum, E. 1979;
Forsum, E., Hambraeus, L, and Siddiqui, I. H. 1973;
Hambraeus, L. 1980;
Hernandez, M., Vega, A., and Sotelo, A. 1981;
Renner, E. 1983;
Renner, E. and Roemer, G. 1973;
Schoppet, E. F., Sinnamon, H. I., Talley, F. B., Panzer, C. C., and Aceto, N. C. 1979;
Seibles, T. S. 1975; and
Towler, C. 1982
can be utilized in the instant invention.

In addition to the foregoing ingredients the coating of my invention may also contain salts and other flavoring materials to improve the overall flavor of the pizza food article of manufacture of my invention.

Thus, salts such as sodium chloride and salt compositions such as those set forth in U.S. Pat. No. 4,514,431 issued on Apr. 30, 1985 comprising:

(a) from about 0.25 up to about 0.80 mole percent of lactic acid and/or a lactate salt;
(b) from 0 up to about 0.09 percent on a dry basis of glycolic acid or a glycolate salt;
(c) from 0 up to about 10.0 mole percent on a dry basis of a magnesium salt;
(d) from about 6 mole percent up to about 50 mole percent on a dry basis of a phosphate and/or a monoacid phosphate and/or a diacid phosphate and/or phosphoric acid taken alone or taken further together with at least one tripolyphosphate; pyrophosphate or polymetaphosphate;
(e) from 0 mole percent up to about 40 mole percent on a dry basis of a sodium salt;
(f) from about 8 mole percent up to about 50 mole percent on a dry basis of a potassium salt;
(g) from about 0.3 mole percent up to about 16 mole percent on a dry basis of a chloride;
(h) from 0 mole percent up to about 30 mole percent on a dry basis of a carbonate and/or a bicarbonate and/or carbonic acid;
(j) from 0 mole percent up to about 2.0 mole percent on a dry basis of a monobasic glutamate and/or a dibasic glutamate and/or glutamic acid; and
(k) from 0 up to about 0.6 mole percent on a dry basis of a calcium salt may be utilized. The disclosure of U.S. Pat. No. 4,514,431 is incorporated herein by reference.

By the same token, salts as set forth in U.S. Pat. No. 4,258,072 issued on Mar. 24, 1981; U.S. Pat. No. 4,216,244 issued on Aug. 5, 1980; U.S. Pat. Nos. 4,216,244; 4,066,793 issued on Jan. 3, 1978 all include salt compositions useful in the practice of my invention. Furthermore, Yamada, German Offenlegungsschrift No. 3 144 166; French Patent No. 2493681 and Japan Published Application J57/079860 disclose seasoning compositions which are useful in the practice of my invention and which may be either:

(i)
15-21 weight percent magnesium chloride;
3-10 weight percent magnesium sulfate;
2-4 weight percent potassium chloride;
0.2-0.5 weight percent magnesium bromide; and
2-7 weight percent sodium chloride; or (ii)
15-21 weight percent magnesium chloride;
6-9 weight percent magnesium sulfate;
2-4 weight percent potassium chloride;
0.2-0.4 weight percent magnesium bromide;
2-6 weight percent sodium chloride; and
0.1-21 weight percent calcium salt.

Furthermore, other salts as disclosed in Japan Patent J81/022311 which discloses a synergistic "seasoning" composition containing monosodium glutamate, a nucleic acid type tasting compound, sodium chloride, succinic acid salt and at least one other sodium salt. The "seasoning" is composed of:
(i) monosodium glutamate;
(ii) nucleic acid-type tasting substance such as disodium inosine-5'-monophosphate and/or disodium guanosine-5'-monophosphate;
(iii) sodium chloride;
(iv) succinic acid and/or sodium succinate; and
(v) at least one salt selected from the group consisting of monosodium fumarate, trisodium citrate, monosodium lactate, calcium lactate, disodium malate, disodium tartarate, sodium ascorbate and monosodium aspartate may also be used in the practice of my invention.

Other salts which may be used are disclosed in Japan Published Application J82/022311; U.S. Pat. No. 3,821,368; Japan Patent J82/00777 issued on Jan. 7, 1982 and U.S. Pat. No. 4,332,823 and U.S. Pat. No. 4,340,614 issued on Jul. 20, 1982.

In addition, other carbohydrates may be used in the coating compositions of my invention such as dextrose monohydrate (for example, CERELOSE ® 2001).

With respect to the barrier layer and/or barrier composition of my invention the weight ratios of starch:gum:cellulose derivative may vary from about 8 (starch):1(gum):10 (cellulose derivative) up to about 200 (starch):1(gum):20 (cellulose derivative).

With respect to the tomato sauce that can be used, various tomato sauces are useful in the practice of my invention, for example, RAGU ® Meatless Marinara Sauce manufactured by the Ragu Foods, Inc., Rochester, N.Y. 14606 containing tomatoes, soybean oil, salt, olive oil, sugar, corn syrup, dried onions, garlic powder and other spices.

With respect to the unsaturated oil of my invention, various unsaturated oils can be used, for example, corn oil, coconut oil, lard, olive oil and palm oil.

With respect to the cheese coating, various cheeses can be used, for example, PROGRESSO ® grated parmesan cheese distributed by Pet Incorporated of St. Louis, Mo. 63102.

With respect the preparation of the pizza food article insofar as heating subsequent to formation of the coatings, various heating techniques well known to those having ordinary skill in the art may be used, for example, the heating techniques set forth on the container for CELESTE ® Cheese Pizza, to wit:

DIRECTIONS:

For a Crisp Crust

1. Place cookie sheet on center oven rack.
2. Preheat oven to 425° F.
3. Remove pizza from carton; remove plastic wrap.
4. Place frozen pizza on PREHEATED cookie sheet.
5. Bake 11 to 13 minutes or until center cheese is melted and crust edge is golden brown.

For an Extra Crisp Crust

Preheat oven to 425° F.
2. Remove pizza from carton remove plastic wrap.
3. Place frozen pizza directly on center oven rack.
4. Bake 9 to 11 minutes or until center cheese is melted and crust edge is golden brown.

Microwave Directions

1. Preheat MICROWAVE BROWNER at HIGH 2½ minutes.
2. Remove pizza from carton; remove plastic wrap.
3. Place frozen pizza on center of PREHEATED browner.
4. Cook at HIGH 4 to 5 minutes or until center cheese is melted rotating BROWNER ¼ turn after each 2 minutes of cooking.

The various condiments that are useful are:
pepperoni;
sausage;
sausage and mushroom;
Canadian style bacon;
vegetable, e.g., broccoli and green pepper and red pepper.

The resulting coatings contain emulsifiers, preferably nonionic sorbitan derivative emulsifiers having one of the structures:

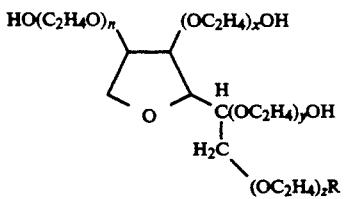

and/or a material or mixture of materials having the structure(s):

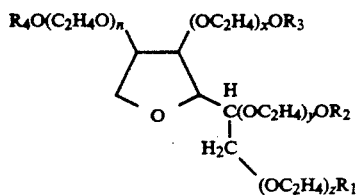

and/or a mixture of materials having the structures:

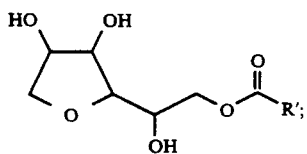

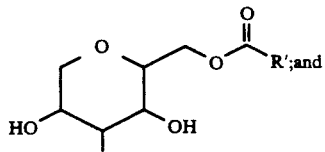

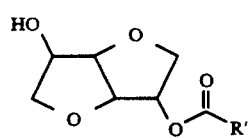

and/or a mixture of materials having the structures:

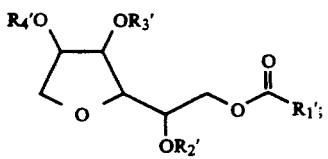

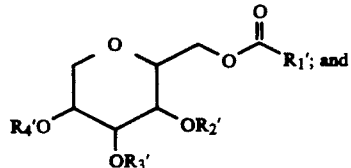

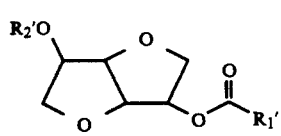

wherein R and R' represent a fatty acid moiety selected from the group consisting of laurate, palmitate, stearate, oleate or tallate; wherein one, two, three or four of $R_1$, $R_2$, $R_3$ and $R_4$ represents the same or different laurate, palmitate, stearate, oleate or tallate and the other of $R_1$, $R_2$, $R_3$ and $R_4$ represents hydrogen; wherein one, two, three or four of $R_1'$, $R_2'$, and $R_3'$ and $R_4'$ represents laurate, palmitate, stearate, oleate or tallate and the other of $R_1'$, $R_2'$, $R_3'$ and $R_4'$ represents hydrogen and wherein $W+X+Y+Z$ is in the range of from 4 up to 80 exemplified by the commercial substances identified as TWEEN® 20, TWEEN® B40, TWEEN® 60, TWEEN® 80, SPAN® 20, SPAN® 40, SPAN® 60, SPAN® 80, T-MAX® 65K and (T-MAZ® 60K (T-MAZ® being a registered trademark of Mazer Chemicals Inc., 3938 Porett Drive, Gunrnee, Ill. 60031) which are defined as follows:

(i) TWEEN® 20 has the structure:

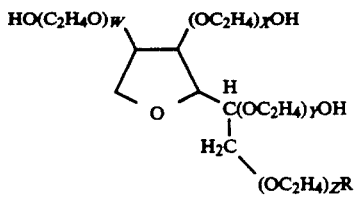

wherein $W+X+Y+Z=20$ and wherein R represents 55% monolaurate and the balance of the R moiety is myristate, palmitate and stearate;

(ii) TWEEN® 80 has the structure:

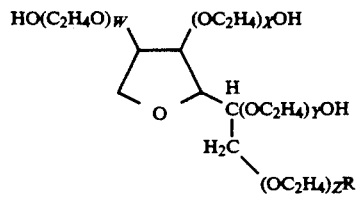

wherein $W+X+Y+Z=20$ and wherein the R moiety is 75% monooleate and the balance is linoleate, palmitate and stearate (iii) TWEEN® 40 has the structure:

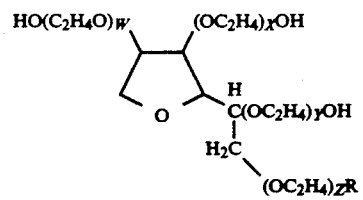

with $W+X+Y+Z=20$ and wherein R represents 90% monopalmitate and 10% stearate;

(iv) TWEEN® 60 has the structure:

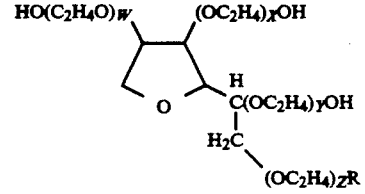

wherein W+X+Y+Z is 20 and the R moiety is 55% monostearate and 45% palmitate;

(v) SPAN® 20 is a mixture of the compounds having the structures:

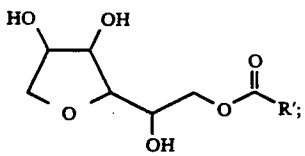

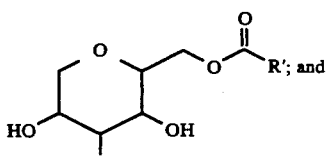

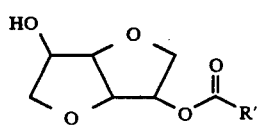

wherein the R' moiety represents laurate;
(vi) SPAN® 80 is a mixture of the compounds having the structures:

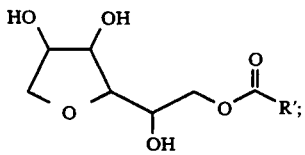

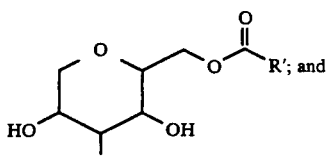

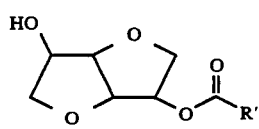

wherein the R' moiety is the monooleate residue;
(vii) SPAN® 40 is a mixture of the compounds having the structures:

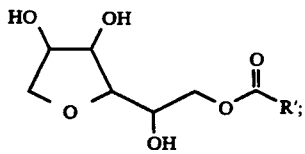

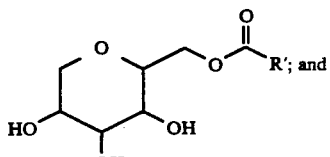

-continued

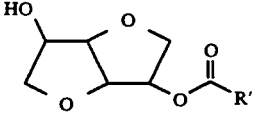

wherein the R' moiety is the monopalmitate residue;
(viii) SPAN® 60 is a mixture of the compounds having the structures:

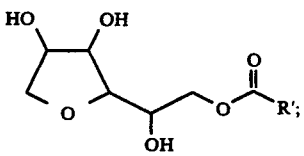

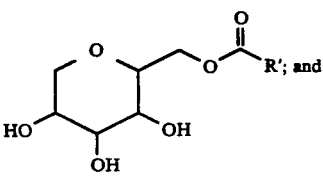

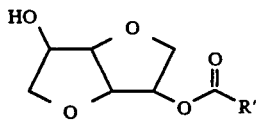

wherein the R' moiety represents the monostearate residue: T-MAZ® 65K (registered trademark of Mazer Chemicals, Inc. of Gurnee, Ill.) is a mixture of compounds defined according to the structure:

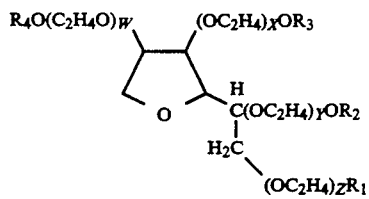

wherein X+W+Y+Z is 20 and three of $R_1$, $R_2$, $R_3$ and $R_4$ represents stearate and the other of $R_1$, $R_2$, $R_3$ and $R_4$ is hydrogen; and T-MAXZ® 60K (a registered trademark of Mazer Chemicals, Inc. of Gurnee, Ill.) is a mixture of compounds defined according to the structure:

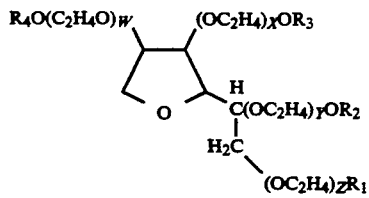

wherein X+W+Y+Z is 20 and one of $R_1$, $R_2$, $R_3$ and $R_4$ is stearate and the other of $R_1$, $R_2$, $R_3$ and $R_4$ is hydrogen.

BRIEF DESCRIPTION OF THE DRAWINGS

FIG. 20 is a cut-away side elevation view of another pizza article of my invention containing a coating overlying the tomato sauce coating lamina and underlying the cheese coating lamina of the pizza article.

FIG. 21 is a cut-away side elevation view of another pizza article of my invention containing a coating overlying the pizza crust; which coating underlies the tomato sauce coating lamina and another coating overlying the tomato sauce lamina and underlying the cheese lamina.

DETAILED DESCRIPTION OF THE DRAWINGS

Three types of coatings can be applied in conjunction with one another to various surfaces of the pizza article, to wit:

I.
  (i) from 5 to 20% whey protein concentrate;
  (ii) from 30 to 60% water;
  (iii) from 0.4–3% cellulose derivative;
  (iv) from 20 to 50% unsaturated edible oil; and
  (v) from 0.2 up to 1% emulsifier.

II.
  (i) from 5 to 20% whey protein concentrate;
  (ii) from 30 to 60% water;
  (iii) from 0.4 to 15% cellulose derivative;
  (iv) from 20 to 50% unsaturated edible oil;
  (v) from 1 to 8% starch polysaccharide;
  (vi) from 0.2 to 1% emulsifer.

III.
  (i) from 40 to 75% starch polysaccharide;
  (ii) from 5 to 20% substituted cellulose derivative;
  (iii) from 0.05–0.5% gum;
  (iv) from 8–20% salt composition;
  (v) from 9–20% sugar.

Each of coatings I, II and III set forth, supra can be applied in the alternative or in combination wherever the term "coating" is used herein.

Figure 1:
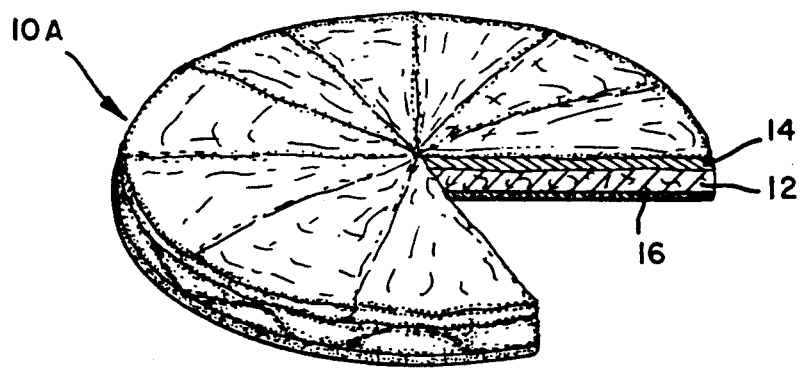
FIG. 1 is a partial cut-away perspective view of a pizza pie according to my invention.

With reference to FIG. 1, the pizza article is indicated by reference numeral 10A. The coating 16 is applied to the pizza dough 12 which can be pre-cooked or uncooked. The topping which can contain cheese, tomato sauce and condiments or only cheese and tomato sauce is indicated by reference numeral 14.

Figure 2:
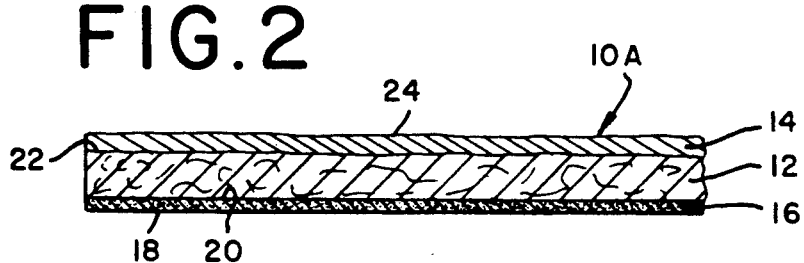
FIG. 2 is a side elevation view of a section of the pizza pie of FIG. 1.

With reference to FIG. 2, the coating 16 having an outer surface 18 (which is placed in contact with a hot surface ultimately) is applied at surface 20 to pizza dough 12 which has on its surface 22 a topping, including tomato sauce and cheese 14 having an outer surface 24.

Figure 3:
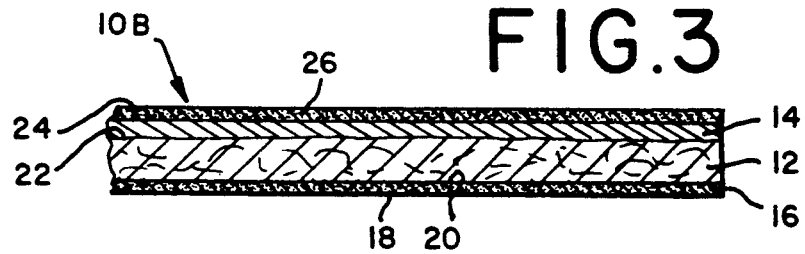
FIG. 3 is a cut-away side elevation view of a variation of the pizza pie of FIG. 1 having two coatings.

With reference to FIG. 3, FIG. 3 sets forth the same article as FIG. 2 only with an additional coating 26 on surface 24. The article of FIG. 3 is indicated by reference numeral 10B.

Figure 4:
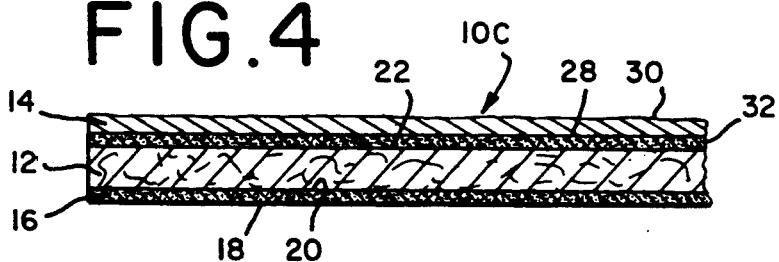
FIG. 4 is a cut-away side elevation view of another variation of the pizza article of my invention having two coatings.

With reference to FIG. 4, the pizza dough 12 has coating 16 and coated on pizza dough lamina 12 on its surface 22 is coating 32. Applied to coating 32 is topping 14 (onto the surface of the coating 28). The surface of the topping containing cheese and tomato sauce and, optionally, other toppings is 30. The article is indicated by reference numeral 10C.

Figure 5:
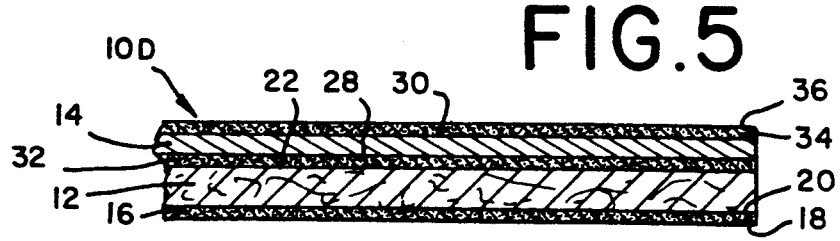
FIG. 5 is a cut-away side elevation view of another variation of the pizza article of my invention having three coatings.

FIG. 5 is an article similar to that shown in FIG. 4 with the exception that on surface 30 of the toppings exists an additional coating 34 having an additional surface 36. The article of FIG. 5 is indicated by reference numeral 10D.

Figure 6:
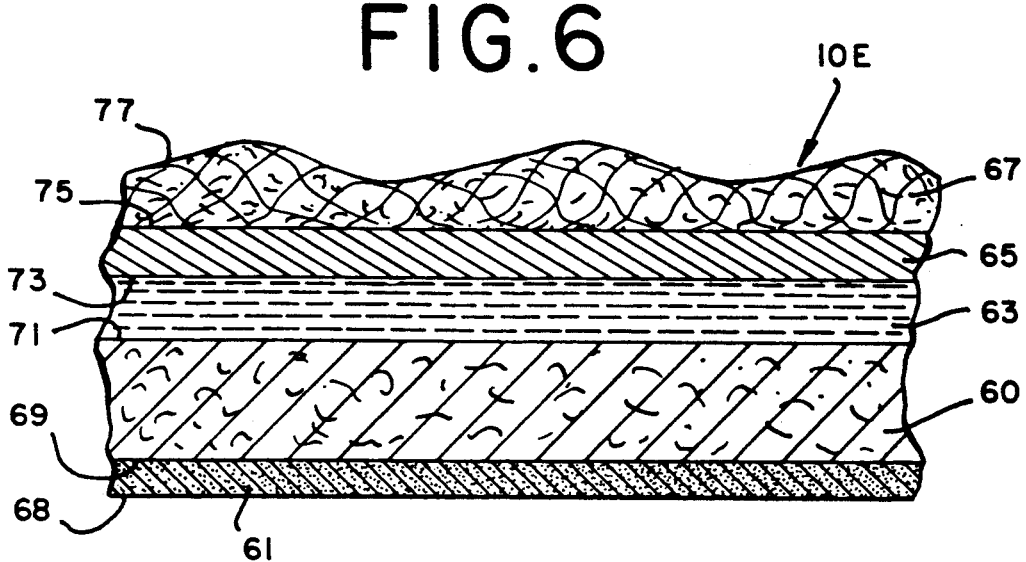
FIG. 6 is a cut-away side elevation view of a pizza article of my invention having one coating with a condiment topping.

With reference to FIG. 6, pizza dough crust 60 has applied to it on its underside surface 69 coating 61 having a surface which will be in contact with a heated solid or refractory at 68. The pizza crust has applied to it a sauce coating on its surface 71, the sauce coating being indicated by reference numeral 63. Applied to the sauce coating on its surface 73 is cheese coating 65 having an upper surface 75 to which is applied a condiment topping, e.g., anchovies 67 having its upper surface indicated by reference numeral 77. The article of FIG. 6 is indicated by reference numeral 10E.

Figure 7:
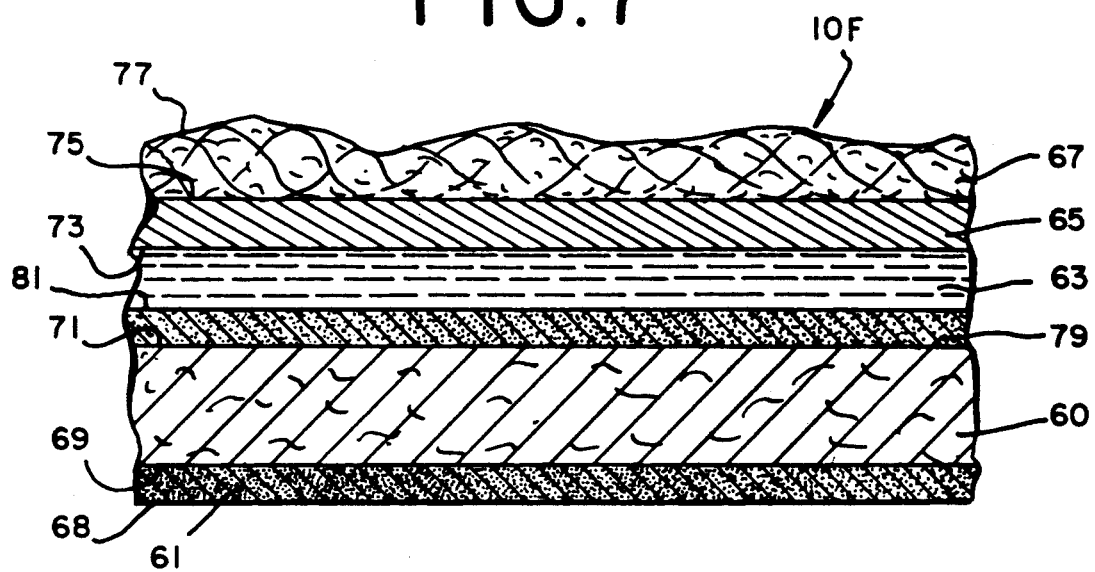
FIG. 7 is a cut-away side elevation view of a variation of a pizza article of my invention having two coatings and a condiment topping.

FIG. 7 illustrates an article similar to that of FIG. 6 with the exception that coated on the pizza crust 60 at surface 71 is coating 79 having a surface 81 onto which is applied the tomato sauce lamina coating 63. The article of FIG. 7 is indicated by reference numeral 10F.

Figure 8:
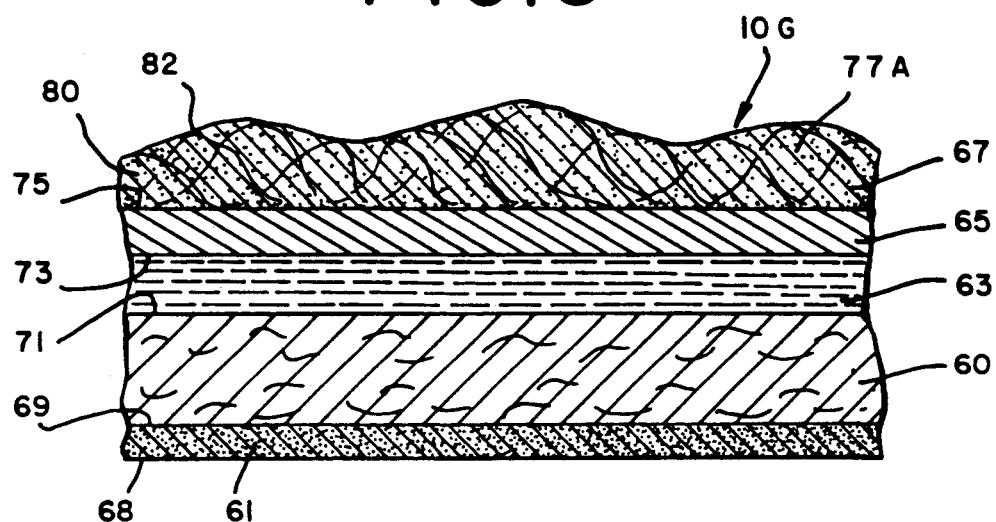
FIG. 8 is a cut-away side elevation view of another variation of a pizza article of my invention having an underlying coating, a condiment topping and a coating on said condiment topping.

FIG. 8 illustrates an article similar to that of FIG. 6 with the exception that a coating 80 is applied to the condiment topping 67 at the surface of the condiment topping 77A, the coating surface being indicated by reference numeral 82. The coating 80 blends in at the surface of the condiment topping 77A with the condiments which are usually of high porosity 67.

Figure 9:
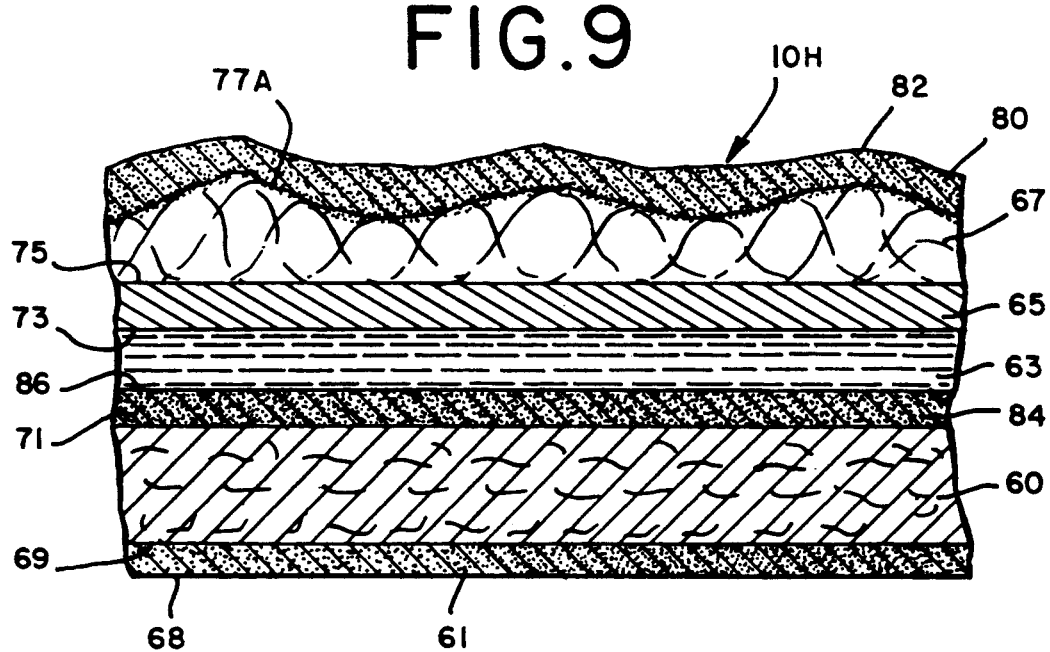
FIG. 9 is a cut-away side elevation view of another variation of a pizza article of my invention having an underlying coating under the crust; an overlying coating on the crust; a condiment topping and a coating on the condiment topping.

FIG. 9 illustrates an article similar to that of FIG. 8 with the exception that on the surface of pizza crust 60 at 71 is coating 84 having a surface 86 in contact with tomato sauce lamina 63.

Figure 10:
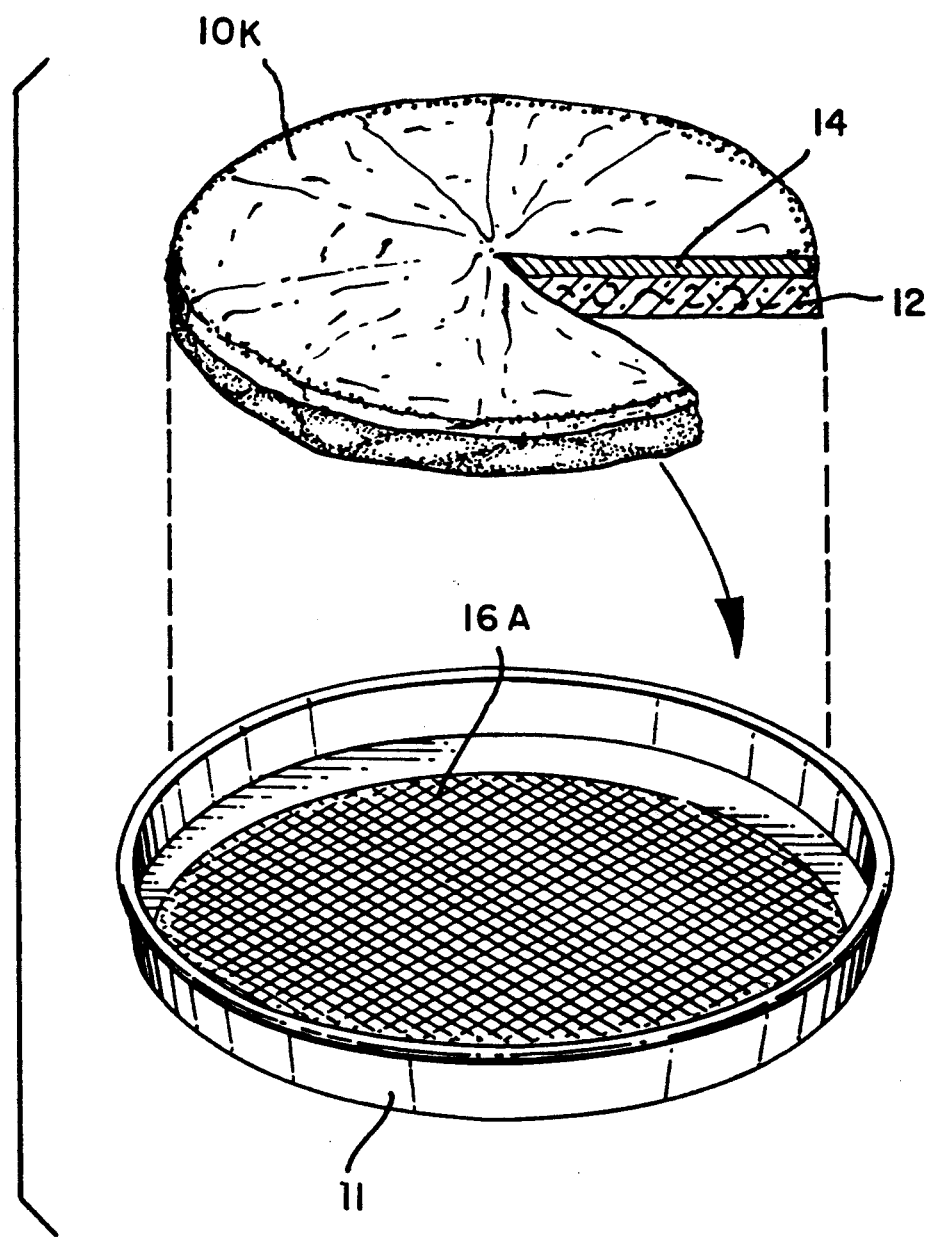
FIG. 10 is a schematic diagram showing the technique for applying a coating of my invention to the underside of a frozen pizza article prior to cooking or re-cooking, in schematic perspective view.

FIG. 10 is a perspective view in schematic diagram form of a technique for applying the coating to a frozen pizza indicated by article 10K. The frozen pizza having pizza dough 12 and topping 14 is placed onto coating 16A which was previously placed into pan 11 prior to heating.

Preferably, the pan is dusted with flour or other appropriate material to break the surface tension prior to placing the coating 16A into pan 11.

Figure 11:
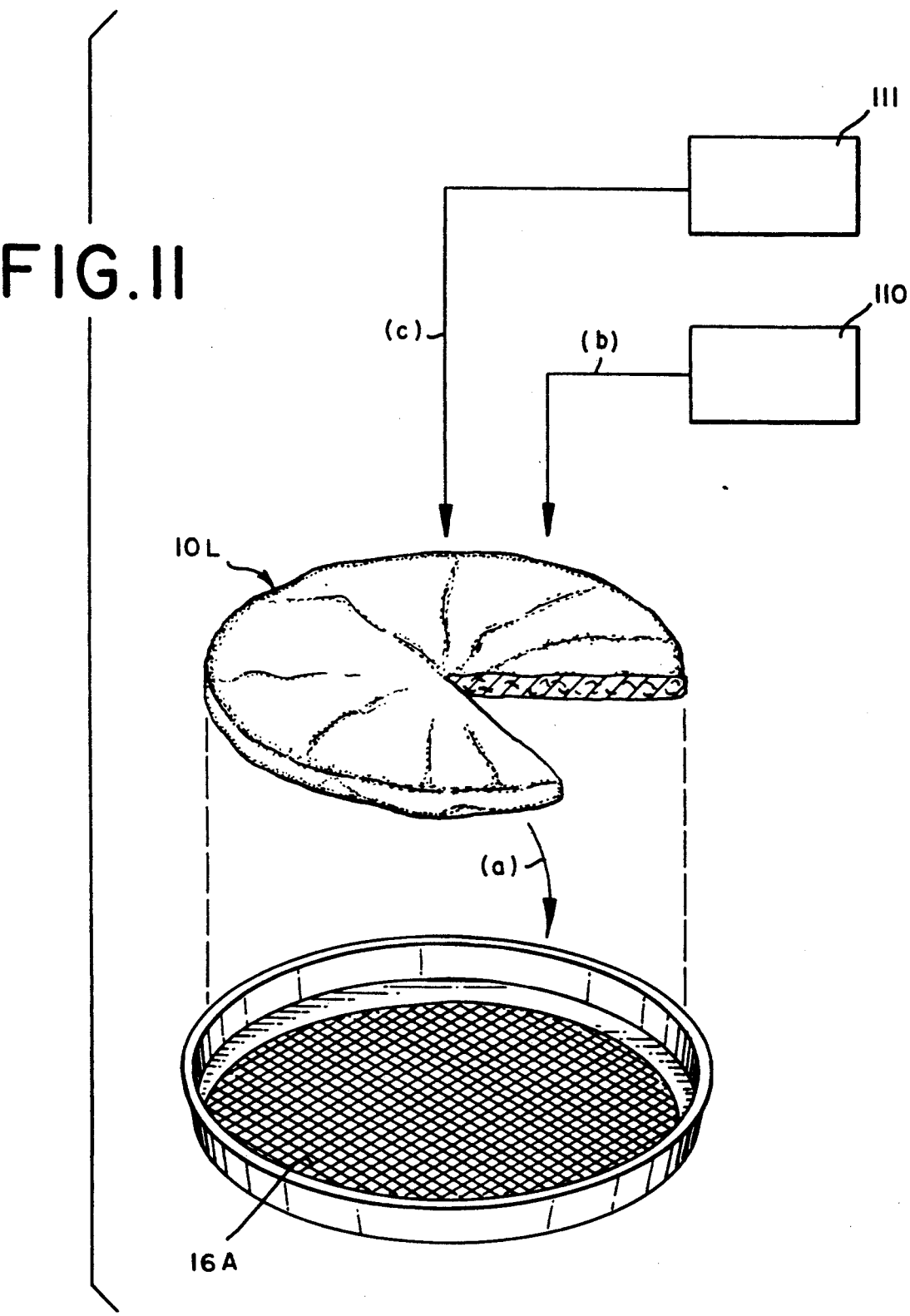
FIG. 11 is a schematic diagram setting forth the elements of a process for coating a surface of a pizza dough lamina prior to coating the pizza dough lamina with other items and prior to cooking.

FIG. 11 is a schematic view of a preferred process for applying the coating to the pizza involving first putting the coating 16A into the pan and then (via arrow "a") placing pizza crust 12 (indicated by article 10L) into the pan and then placing tomato sauce from source 110 onto the crust and then placing the cheese lamina indicated by reference numeral 111 onto the tomato sauce coating.

Figure 12:
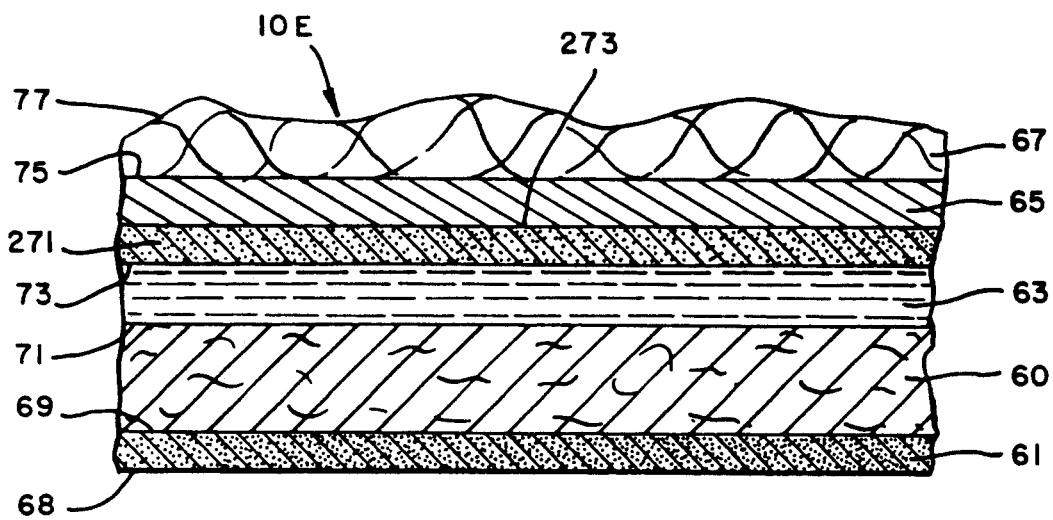
FIG. 12 is a schematic cut-away side elevation view of another variation of a pizza article of my invention having a coating underlying the pizza crust and another coating overlying the tomato sauce; and having a condiment topping.

FIG. 12 is a variation of the pizza article of FIG. 6 except that an additional coating 271 is placed on the surface of the tomato sauce lamina 73 and under the cheese lamina 65, the additional coating being indicated by reference numeral 271 and the upper surface of the coating onto which the cheese is applied being indicated by reference numeral 273. The entire article is indicated by reference numeral 10E.

Figure 13:
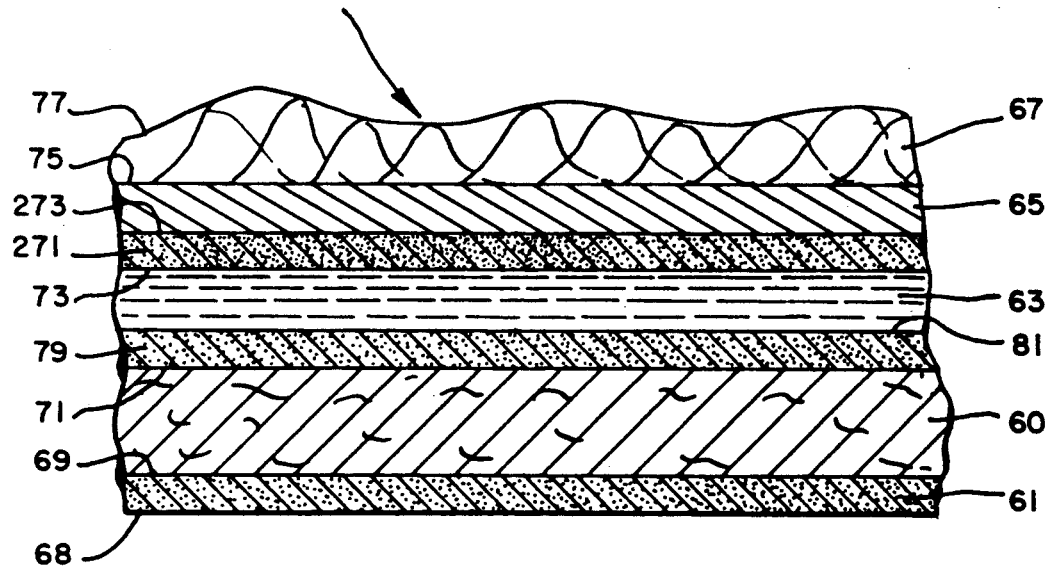
FIG. 13 is a cut-away side elevation view of another variation of a pizza article of my invention having a coating underlying the pizza crust; an overlying coating on the pizza crust and another coating overlying the tomato sauce and having a condiment topping.

FIG. 13 is another variation of the article of FIG. 12 with the exception that on surface 71 of pizza crust 60 is applied coating 79 having as its upper surface 81 on which is applied tomato sauce lamina 63.

Figure 14:
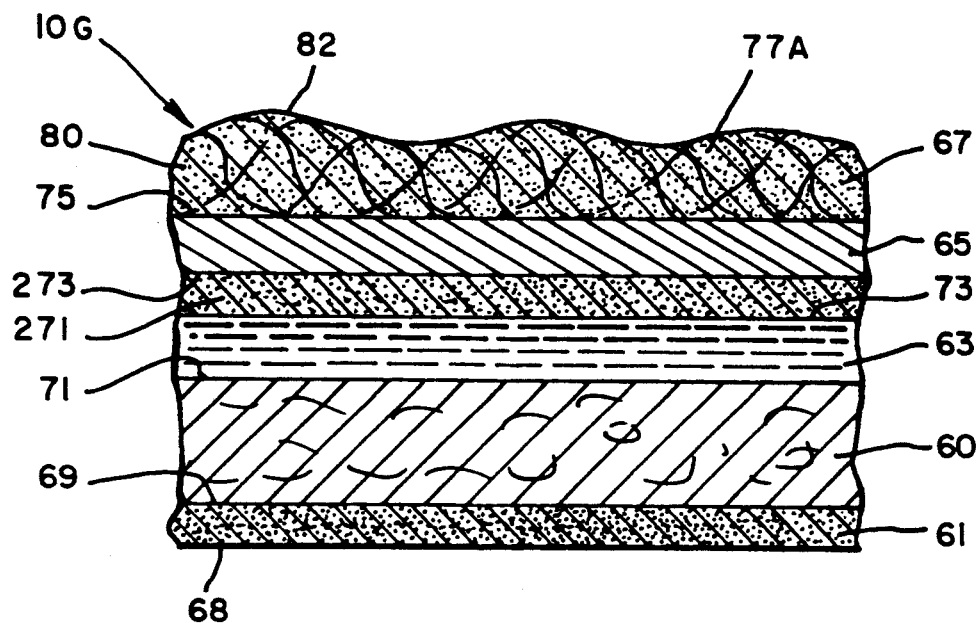
FIG. 14 is a cut-away side elevation view of another variation of a pizza article of my invention having a coating underlying the crust; another coating on the tomato sauce layer and a condiment topping and yet, another coating on the condiment topping.

FIG. 14 illustrates another variation of the pizza article of FIG. 12 with an additional coating 80 on the surface of the condiment topping 67 at surface 77A with the surface of the coating on the condiment topping being indicated by reference numeral 82. The coating 80 blends in with the condiment topping 67 which is usually highly porous. The article of FIG. 14 is shown by reference numeral 10G.

Figure 15:
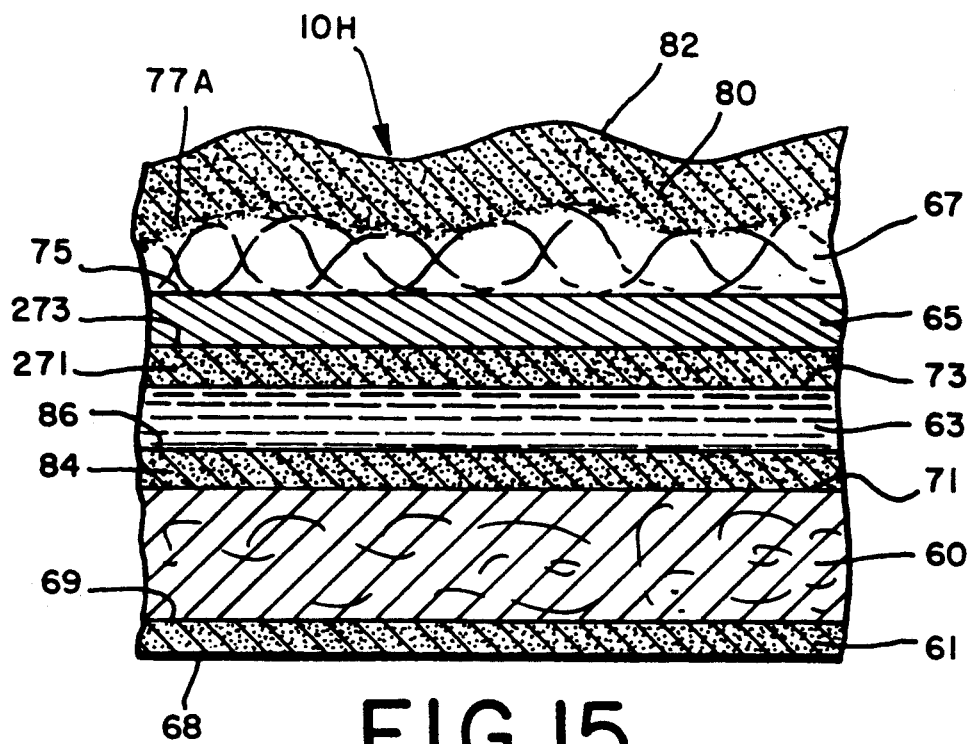
FIG. 15 is a cut-away side elevation view of another pizza article of my invention having an underlying coating on the pizza crust; an overlying coating on the pizza crust; a coating on the tomato sauce; a condiment topping and a coating on the condiment topping.

FIG. 15 is a variation of the pizza article of FIG. 14 with an additional coating 84 on the surface of pizza crust 60 at 71, the surface of the coating being indicated by reference numeral 86 on which is applied tomato sauce lamina 63.

Figure 16:
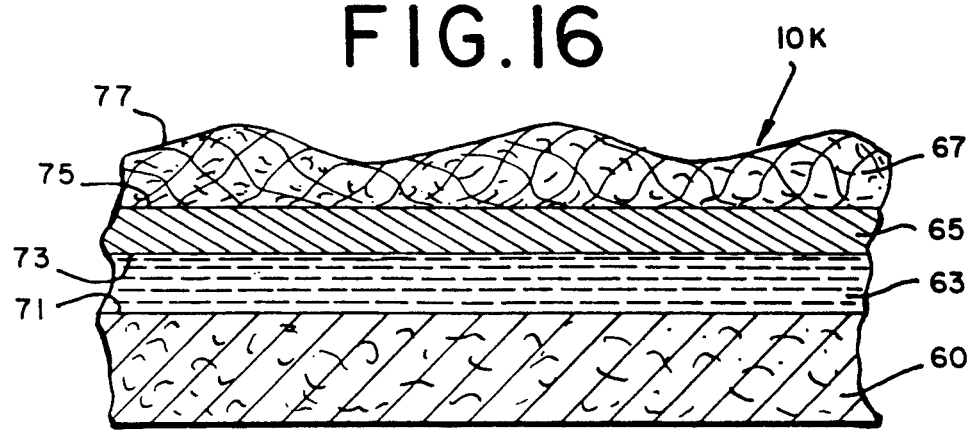
FIG. 16 is a cut-away side elevation view of a pizza article containing no coatings.

FIG. 16 is a variation of the pizza article of FIG. 6 without the bottom coating 61 and the entire article is indicated by reference numeral 10K.

Figure 17:
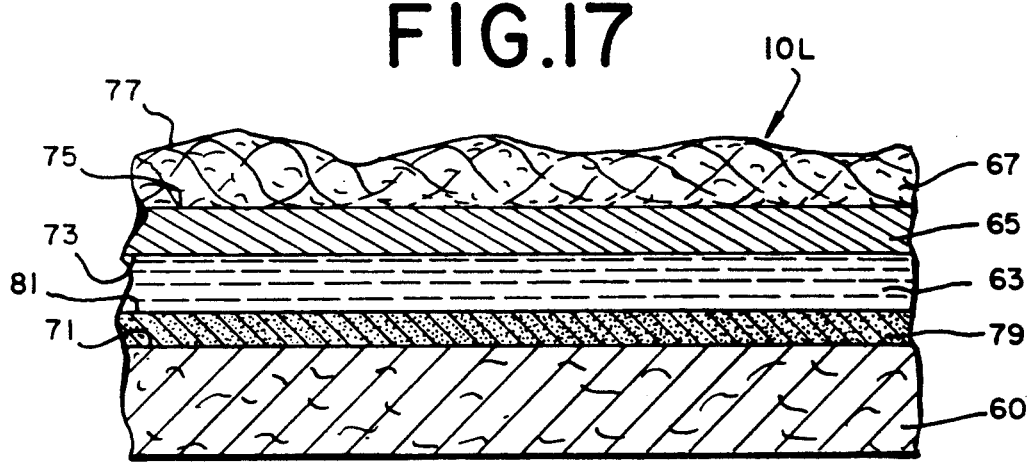
FIG. 17 is a cut-away side elevation view of a pizza article of my invention containing one coating, overlying the pizza crust and underlying the tomato sauce lamina.

FIG. 17 is a variation of the pizza article of FIG. 7 without bottom coating 61 and is indicated as an entire article by reference numeral 10L.

Figure 18:
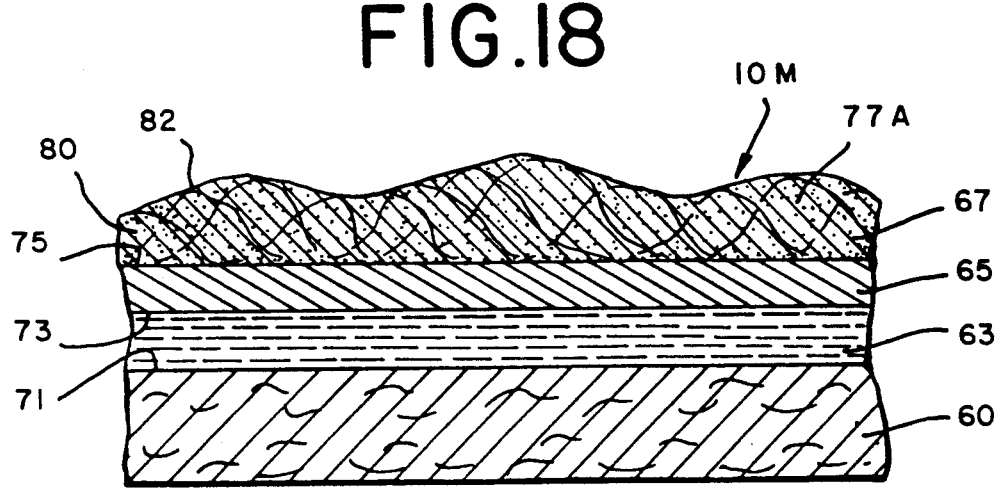
FIG. 18 is a cut-away side elevation view of another variation of a pizza article of my invention containing a coating over the condiment topping.

FIG. 18 illustrates a variation of the pizza article of FIG. 8 without the bottom coating 61 and is shown by reference numeral 10M.

Figure 19:
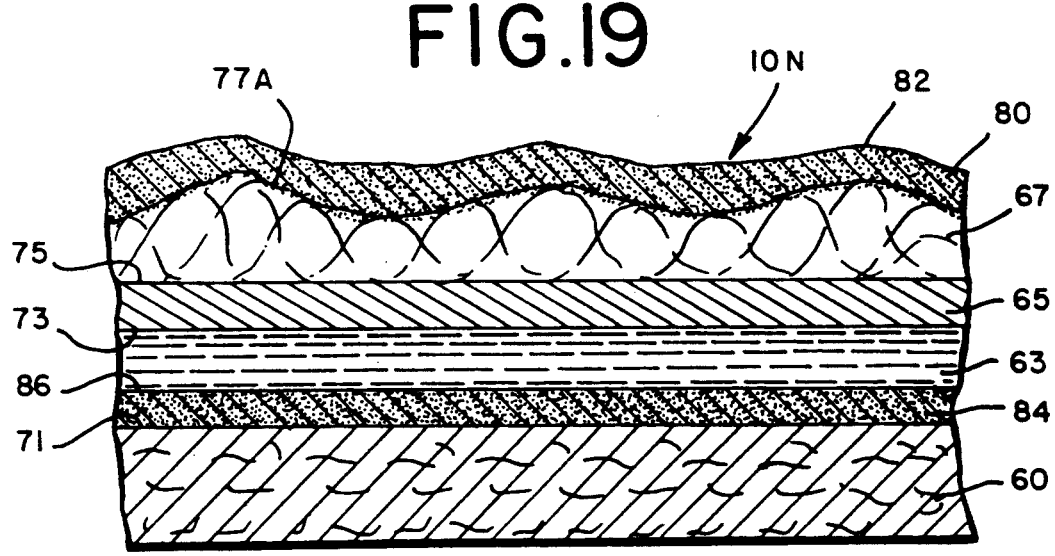
FIG. 19 is a cut-away side elevation view of another pizza article of my invention containing a coating over the pizza crust and underlying the tomato sauce lamina and a second coating overlying the condiment topping.

FIG. 19 illustrates a variation of the pizza article of FIG. 9 without the bottom coating 61 and is shown overall by reference numeral 10N.

FIG. 20 illustrates a variation of the pizza article of FIG. 12 without the bottom coating 61 and is shown as an article using reference numeral 10P.

FIG. 21 illustrates a variation of the pizza article of FIG. 13 without the bottom coating 61 and is shown using reference numeral 10R.

Figure 22:
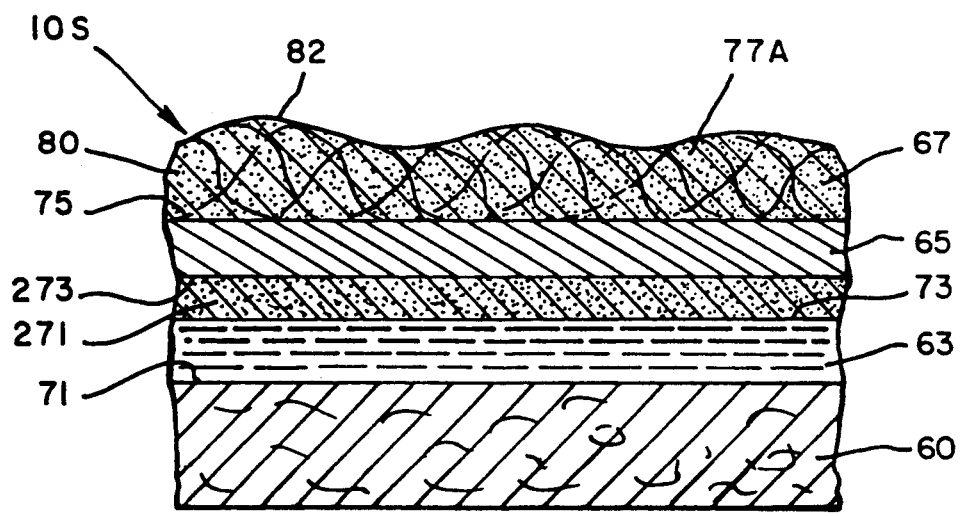
FIG. 22 is a cut-away side elevation view of another pizza article of my invention having a coating overlying the tomato sauce lamina and underlying the cheese lamina and another coating overlying the condiment toppings.

FIG. 22 illustrates a variation of the pizza article of FIG. 14 without the bottom coating 61 and is shown by reference numeral 10S.

Figure 23:
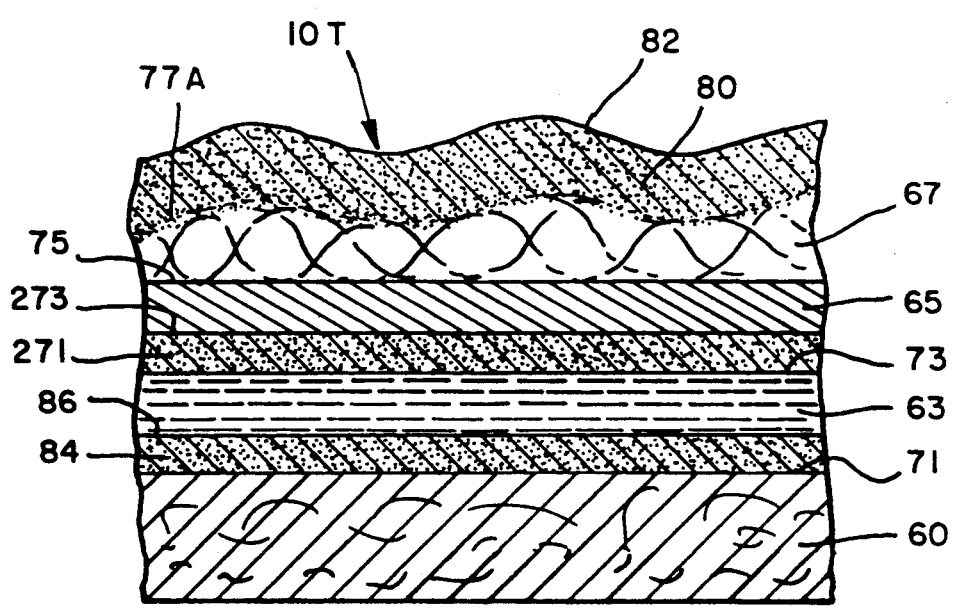
FIG. 23 is a cut-away side elevation view of another pizza article of my invention containing a coating overlying the tomato sauce coating lamina and underlying the cheese coating lamina and another coating overlying the condiment topping of the pizza article.

FIG. 23 illustrates a variation of the pizza article of FIG. 15 without the bottom coating 61 and is shown using reference numeral 10T.

EXAMPLES I-VII

The following table sets forth mixtures of salts (with each salt given as a weight percentage) to produce mixed seasonings useful in the practice of my invention. Each mixture is given as a separate example. Each of the mixtures of each of the examples will be used in examples following Example XVI.

TABLE III

| Ingredient | EXAMPLE | | | | | | |
| --- | --- | --- | --- | --- | --- | --- | --- |
| | I | II | III | IV | V | VI | VII |
| $KH_2PO_4$ | — | 72.38 | 73.12 | 72.42 | 75.62 | — | — |
| Lactic Acid 22% | 3.09 | 2.09 | 2.11 | 2.09 | 2.18 | 3.0 | 2.29 |
| Glycolic Acid 85% | 0.08 | 0.05 | — | — | — | — | — |
| $Mg_3(PO_4)_2.4H_2O$ | 10.90 | — | — | — | — | — | — |
| $CaHPO_4.2H_2O$ | 0.90 | 0.61 | — | 0.61 | 0.50 | 0.70 | — |
| NaCl | 5.24 | 3.54 | 3.58 | 3.54 | 3.70 | 5.10 | 15.22 |
| KCl | 0.52 | 0.35 | — | 0.35 | 0.38 | 0.50 | 0.38 |
| Monosodium Glutamate.$H_2O$ | 2.90 | 1.96 | 1.98 | 1.96 | 2.06 | 2.82 | 2.15 |
| $NaHCO_3$ | 22.02 | — | 15.04 | 14.90 | 15.56 | 21.38 | — |
| $KHCO_3$ | — | 14.89 | — | — | — | — | — |
| $K_2CO_3$ | 54.35 | — | — | — | — | — | — |
| $MgCO_3$ | — | 4.13 | 4.17 | 4.13 | — | — | — |
| $K_2HPO_4$ | — | — | — | — | — | 66.50 | 79.24 |
| Calcium Chloride | — | — | — | — | — | — | 0.72 |

EXAMPLES VIII-XVI

The following Table IV sets forth mixtures of non-sodium-containing salts to produce mixed seasonings useful in the practice of my invention. Each mixture is given as a separate example. Each of the mixtures of each of the examples will be used in examples following the instant Examples VIII-XVI:

TABLE IV

| Ingredient | VIII | IX | X | XI | XII | XIII | XIV | XV | XVI |
|---|---|---|---|---|---|---|---|---|---|
| $KH_2PO_4$ | 90.98 | 85.94 | 89.16 | 94.06 | 86.61 | 92.18 | 95.90 | 79.24 | 93.84 |
| Lactic Acid 22% | 2.62 | 2.48 | 2.57 | 4.24 | 3.91 | 4.16 | 2.77 | 2.29 | 2.71 |
| $CaHPO_4.2H_2O$ | 0.77 | 0.72 | 0.75 | 0.99 | 0.91 | 0.97 | — | — | — |
| $CaCl_2$ | — | — | 0.43 | — | — | — | 0.87 | 0.72 | 0.85 |
| KCl | 0.44 | 3.96 | — | 0.71 | 5.75 | 0.69 | 0.46 | 15.60 | 0.45 |
| $MgCO_3$ | 5.19 | 4.90 | 5.08 | — | — | — | — | — | — |
| Monopotassium Glutamate.$H_2O$ | — | 2.00 | 2.00 | — | 2.82 | 2.00 | — | 2.15 | 2.15 |

The foregoing examples, shown in mole percents of anions, cations and substantially nonionic acids (e.g., lactic acid) are set forth in terms of such ions and free acids in Table V below.

TABLE V

| Ingredient | VIII | IX | X | XI | XII | XIII | XIV | XV | XVI |
|---|---|---|---|---|---|---|---|---|---|
| $K^+$ | 45.3% | 45.6% | 45.5% | 49.30% | 49.3% | 49.3% | 49.0% | 49.2% | 49.0% |
| $H_2PO_4^-$ | 45.0% | 41.6% | 44.4% | 48.60% | 43.2% | 47.9% | 48.6% | 35.7% | 47.8% |
| $HPO_4^=$ | 0.3% | 0.276% | 0.297% | 0.402% | 0.359% | 0.399% | — | — | — |
| $Ca^{++}$ | 0.3% | 0.277% | 0.297% | 0.722% | 0.359% | 0.399% | 0.545% | 0.401% | 0.515% |
| $Cl^-$ | 0.398% | 0.35% | 0.392% | 0.662% | 5.25% | 0.658% | 1.51% | 13.61% | 1.49% |
| $Mg^{++}$ | 4.15% | 3.84% | 4.11% | — | — | — | — | — | — |
| $CO_3^=$ | 4.15% | 3.84% | 4.11% | — | — | — | — | — | — |
| Lactic acid | 0.434% | 0.396% | 0.425% | — | 0.646% | 0.694% | 0.465% | 0.342% | 0.458% |
| Glutamate ion | — | 0.65% | 0.668% | — | 0.942% | 0.696% | — | 0.650% | 0.735% |

Table VI below sets forth the mole ratio of metal cation (e.g., potassium ion, calcium ion and magnesium ion) to total moles of anion, cation and free acid, e.g., lactic acid.

TABLE VI

| Ingredient | VIII | IX | X | XI | XII | XIII | XIV | XV | XVI |
|---|---|---|---|---|---|---|---|---|---|
| Mole ratio of metal cation: anion + cation + free acids | 0.498 | 0.499 | 0.498 | 0.497 | 0.497 | 0.496 | 0.495 | 0.496 | 0.496 | of the pizza articles as indicated in FIGS. 1, 2, 3, 4, 5, 6, 7, 8, 9, 12, 13, 14, 15, 17, 18, 19, 20, 21, 22 and 23.

Each of the pizza articles is baked 11 minutes until the center cheese lamina is melted and the crust edge is golden brown. The resulting product has unexpectedly and unobviously long shelf stability and can be reheated a number of times while retaining its mouth-feel and original flavor nuances.

EXAMPLE XVII

Into a 10 liter reaction vessel equipped with heater is placed 2.5 kilograms of water. The water is heated to 190° F. and 672 grams of METHOCEL ® A15-LY and 7.20 grams of KELTROL ® xanthan gum is added with stirring.

METHOCEL ® A15-LV is a methylcellulose composition manufactured by Dow Chemical Company of Midland, Mich. 48674 containing 97% methylcellulose; 2% water and 1% sodium chloride. KELTROL ® xanthan gum is manufactured by Keltrol Corporation of Okmulgee, Okla. 3408 Grams of "CRISP FILM ®, amylose corn starch manufactured by National Starch & Chemical Corporation, Food Products Division of Finderne Avenue, P.O. Box 6500, Bridgewater, N.J. 08807 is then added to the resulting mixture. The resulting product is stirred and 1 liter of cold water together with 276 grams of National 78-0104 a coarsely ground, pre-cooked tapioca starch, manufactured by National Starch & Chemical Corporation, Food Products Division is added (used to aid in the dispersion of the product).

800 Grams of the salt mixture of Example I, supra, is then added to the mixture and sufficient water is added to cause the resulting product to be coatable onto each

EXAMPLE XVIII

Into a 5 liter reaction vessel equipped with heater is placed 1440 grams water. The water is heated to 190° F. and 300 grams SAVORPRO ® 7502 a high gel strength 75% minimum protein whey protein concentrate manufactured by Express Foods Company, Inc., 11001 Bluegrass Parkway, Suite 200, Louisville, Ky. is added to the water. 30 Grams of METHOCEL ® A15-LV is then added with stirring together with 12.0 grams of TWEEN ® 80 having the structure:

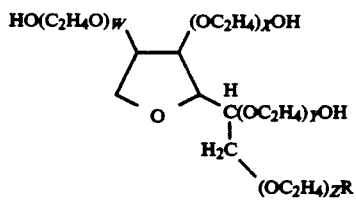

wherein $W+X+Y+Z=20$ and wherein the R moiety is 75% monooleate and the is linoleate, palmitate and stearate. METHOCEL ® A15-LV is a methylcellulose composition manufactured by Dow Chemical Company of Midland, Mich. 48674 containing 97% methylcellulose; 2% water and 1% sodium chloride. With stirring, 9.0 grams of butylated hydroxy anisole is added with 1209 grams of corn oil. The resulting mixture is heated at 190° F. for a period of two hours. At the end of the two hour period, the resulting material is then coated onto pizza articles as shown in FIGS. 1, 2, 3, 4, 5, 6, 7, 8, 9, 12, 13, 14, 15, 17, 18, 19, 20, 21, 22 and 23.

The resulting pizza articles are cooked in a microwave oven 4.5 minutes until the center cheese is melted.

The resulting pizza articles each have exceptional, unexpected, unobvious shelf stability even after re-heating several times. The original flavor nuances and mouth-feel is retained even after reheating four times.

EXAMPLE XIX

Into a 5 liter reaction vessel equipped with heater is placed 1440 grams water. The water is heated to 190° F. and 300 grams SAVORPRO ® 7502 a high gel strength 75% minimum protein whey protein concentrate manufactured by Express Foods Company, Inc., 11001 Bluegrass Parkway, Suite 200, Louisville, Ky. 40299 is added to the water. 30 Grams of METHOCEL ® A15-LV is then added with stirring together with 12.0 grams of TWEEN ® 80 having the structure:

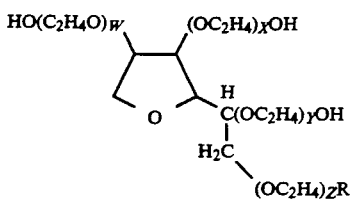

wherein $W+X+Y+Z+20$ and wherein the R moiety is 75% monooleate and the balance is linoleate, palmitate and stearate. METHOCEL ® A15-LV is a methylcellulose composition manufactured by Dow Chemical Company of Midland, Mich. 48674 containing 97% methylcellulose; 2% water and 1% sodium chloride. With stirring, 9.0 grams of butylated hydroxy anisole is added with 1209 grams of corn oil. The resulting mixture is heated at 190° F. for a period of two hours. To the resulting mixture, 120 grams of CRISP FILM ® amylose corn starch manufactured by National Starch And Chemical Corporation, Food Products Division, Findern Avenue, P.O. Box 6500, Bridgewater, N.J. 08807 is then added to the resulting mixture.

The resulting mixture is then re-heated for a period of four hours at 170° F.

The resulting coating composition is then coated onto pizza articles as shown in FIGS. 1, 2, 3, 4, 5, 6, 7, 8, 9, 12, 13, 14, 15, 17, 18, 19, 20, 21, 22 and 23.

The resulting pizza articles are cooked in a microwave oven 4.5 minutes until the center cheese is melted.

The resulting pizza articles each have exceptional, unexpected, unobvious shelf stability even after reheating several times. The original flavor nuances and mouth-feel is retained even after reheating four times.

EXAMPLE XX

Into a 5 liter reaction vessel equipped with heater is placed 1440 grams of water. The water is heated to 190° F. and 300 grams SAVORPRO ® 7502 a high gel strength 75% minimum protein whey protein concentrate manufactured by Express Foods Company, Inc., 11001 Bluegrass Parkway, Suite 200, Louisville, Ky. 40299 is added to the water. 30 Grams of METHOCEL ® A15-LV is then added with stirring together with 12.0 grams of TWEEN ® 80 having the structure:

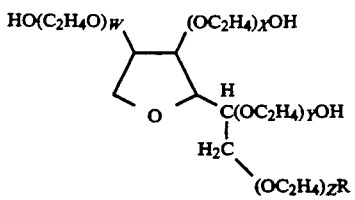

wherein $W+X+Y+Z=20$ and wherein the R moiety is 75% monooleate and the balance is linoleate, palmitate and stearate. METHOCEL ® A15-LV is a methylcellulose composition manufactured by Dow Chemical Company of Midland, Mich. 48674 containing 97% methylcellulose; 2% water and 1% sodium chloride. With stirring, 5.40 grams of butylated hydroxy anisole is added with 1206 grams of corn oil. The resulting mixture is heated at 190° F. for a period of two hours. To the resulting mixture, 9.00 grams of sodium benzoate is added with stirring. The resulting mixture is stirred for one hour at 112° F.

The resulting material is then coated on pizza articles as shown in FIGS. 1, 2, 3, 4, 5, 6, 7, 8, 9, 12, 13, 14, 15, 17, 8, 19, 20, 21, 22 and 23.

The resulting pizza articles are cooked in a microwave oven 4.5 minutes until the center cheese is melted.

The resulting pizza articles each have exceptional, unexpected, unobvious shelf stability even after reheating several times. The original flavor nuances and mouth-feel is retained even after reheating four times.

What is claimed is:

1. A pizza food article consisting essentially of:
   (a) a pizza dough lamina having a first pizza dough lamina surface and a second pizza dough lamina surface;
   (b) a substantially continuous tomato sauce composition lamina having a substantially horizontal planar upper tomato sauce composition lamina surface and a substantially horizontal planar lower tomato sauce composition lamina surface; and
   (c) a cheese composition lamina having a substantially planar cheese composition lamina upper surface and a substantially planar cheese composition lamina lower surface; and, optionally,
   (d) a condiment coating having a lower condiment surface and an upper condiment surface;

and coated on at least one of the surfaces of the pizza dough lamina, the tomato sauce composition lamina surfaces, the cheese composition lamina surfaces and/or the condiment composition surfaces, a coating comprising either:

I.
   (i) from 5 up to 20% whey protein concentrate;
   (ii) from 30 up to 60% water;
   (iii) from 0.4 up to 3% of methyl cellulose;
   (iv) from 20 up to 50% of an unsaturated edible oil selected from the group consisting of coconut oil, corn oil, olive oil and lard;
   (v) from 0.2% up to 1% of an emulsifier; and
   (vi) optionally, from 1 up to 8% of a starch;

or

II.
   (i) from 40 up to 75% of a starch;
   (ii) from 5 up to 20% of methyl cellulose;

(iii) from 0.05 up to 0.5% by weight of xanthan gum;

(iv) from 8% up to 20% by weight of a salt composition; and (v) from 9 up to 20% by weight of a sugar said pizza article having the properties subsequent to reheating of:

(x) high shelf stability;

(y) original flavor nuance retention; and (z) original mouthfeel retention.

2. A method for producing the edible pizza food article of claim 1 comprising the steps of:

(a) applying a continuous layer of a first coating composition comprising:
  (i) from about 5 up to about 20% by weight of whey protein concentrate;
  (ii) from about 30 up to about 60% by weight of water;
  (iii) from about 0.4 up to about 20% by weight of methyl cellulose;
  (iv) from about 20 up to about 50% of an unsaturated edible oil selected from the group consisting of coconut oil, corn oil, olive oil and lard;
  (v) from about 0.2% up to about 1% by weight of an emulsifier; and
  (vi) optionally, from about 1 up to 8% of a starch to a thermally conductive or non-conductive substantially horizontally planar surface thereby forming a first coating lamina having a substantially horizontally planar coating composition lamina surface;

(b) applying a continuous layer of pizza dough to said first coating lamina thereby forming a first pizza dough lamina having a substantially horizontal planar pizza dough lamina surface;

(c) applying at least one substantially continuous layer of a tomato sauce composition to substantially the entirety of said pizza dough lamina surface thereby forming a tomato sauce composition lamina having a substantially horizontally planar upper tomato sauce composition lamina surface;

(d) applying at least one cheese composition to substantially the entirety of said upper tomato sauce composition lamina surface thereby forming a cheese composition lamina having a substantially horizontally planar cheese composition lamina surface; and (e) baking the product to completion;

whereby the resulting pizza food article has the properties subsequent to reheating of:

(x) high shelf stability;

(y) original flavor nuance retention; and (z) original mouthfeel retention.

3. A method for producing the edible pizza food article of claim 1 consisting of the steps of:

(a) applying a continuous layer of a first coating composition comprising:
  (i) from about 5 up to about 20% by weight of whey protein concentrate;
  (ii) from about 30 up to about 60% by weight of water;
  (iii) from about 0.4 up to about 20% by weight of methyl cellulose;
  (iv) from about 20 up to about 50% of an unsaturated edible oil selected from the group consisting of coconut oil, corn oil, olive oil and lard;
  (v) from about 0.2% up to about 1% by weight of an emulsifier; and
  (vi) from about 1 up to 8% of a starch to a thermally conductive or non-conductive substantially horizontally planar surface thereby forming a first coating lamina having a substantially horizontally planar coating composition lamina surface;

(b) applying a continuous layer of pizza dough to said first coating lamina thereby forming a first pizza dough lamina having a substantially horizontal planar pizza dough lamina surface;

(c) applying at least one substantially continuous layer of a tomato sauce composition to substantially the entirety of said pizza dough lamina surface thereby forming a tomato sauce composition lamina having a substantially horizontally planar upper tomato sauce composition lamina surface;

(d) applying at least one cheese composition to substantially the entirety of said upper tomato sauce composition lamina surface thereby forming a cheese composition lamina having a substantially horizontally planar cheese composition lamina surface; and (e) baking the product to completion;

whereby said pizza food article has the properties subsequent to reheating of:

(x) high shelf stability;

(y) original flavor nuance retention; and (z) original mouthfeel retention.

4. A method for producing the edible pizza food article of claim 1 consisting of the steps of:

(a) applying a continuous layer of a first coating composition comprising:
  (i) from about 40 up to about 75% by weight of a starch;
  (ii) from about 5 up to about 20% by weight of methyl cellulose;
  (iii) from about 0.05 up to about 0.5% by weight of xanthan gum;
  (iv) from about 8 up to about 20% by weight of a salt composition; and
  (v) from about 9 up to about 20% by weight of a sugar to a thermally conductive or non-conductive substantially horizontally planar surface thereby forming a first coating lamina having a substantially horizontally planar coating composition lamina surface;

(b) applying a continuous layer of pizza dough to said first coating lamina thereby forming a first pizza dough lamina having a substantially horizontally planar pizza dough lamina surface;

(c) applying at least one substantially continuous layer of a tomato sauce composition to substantially the entirety of said pizza dough lamina surface thereby forming a tomato sauce composition lamina having a substantially horizontally planar upper tomato sauce composition lamina surface;

(d) applying at least one cheese composition to substantially the entirety of said upper tomato sauce composition lamina surface thereby forming a cheese composition lamina having a substantially horizontally planar cheese composition lamina surface; and (e) baking the product to completion;

whereby the resulting pizza food article has the properties subsequent to reheating of:

(x) high shelf stability;

(y) original flavor nuance retention; and (z) original mouthfeel retention.

5. A method for producing the edible pizza food article of claim 1 consisting of the steps of:
   (a) applying a continuous layer of a first coating composition comprising:
      (i) from about 5 up to about 20% by weight of whey protein concentrate;
      (ii) from about 30 up to 60% by weight of water;
      (iii) from about 0.4 up to about 20% by weight of methyl cellulose;
      (iv) from about 20 up to about 50% of an unsaturated edible oil selected from the group consisting of coconut oil, corn oil, olive oil and lard;
      (v) from about 0.2% up to about 1% by weight of an emulsifier; and
      (vi) from about 1 up to 8% of a starch
      to a thermally conductive or non-conductive substantially horizontally planar solid surface thereby forming a first coating lamina having a substantially horizontally planar coating composition lamina surface;
   (b) applying a continuous layer of pizza dough to said first coating lamina thereby forming a first pizza dough lamina having a substantially horizontally planar pizza dough lamina surface;
   (c) applying a continuous layer of a second coating composition consisting of:
      (i) from about 5 up to about 20% by weight of whey protein concentrate;
      (ii) from about 30 up to about 60% by weight of water;
      (iii) from about 0.4 up to about 20% by weight of methyl cellulose;
      (iv) from about 20 up to about 50% of an unsaturated edible oil selected from the group consisting of coconut oil, corn oil, olive oil and lard;
      (v) from about 0.2% up to about 1% by weight of an emulsifier; and
      (vi) optionally, from about 1 up to 8% of a starch,
      to the pizza dough lamina surface thereby forming a second coating lamina having a substantially horizontally planar coating compoaition lamina surface;
   (d) applying at least one substantially continuous layer of a tomato sauce composition to substantially the entirety of said second coating lamina surface thereby forming a tomato sauce composition lamina having a substantially horizontally planar upper tomato sauce composition lamina surface;
   (e) applying at least one cheese composition to substantially the entirety of said upper tomato sauce composition lamina surface thereby forming a cheese composition lamina having a substantially horizontally planar cheese composition lamina surface; and
   (f) baking the product to completion,
   whereby said pizza food article has the properties subsequent to reheating of:
      (x) high shelf stability;
      (y) original flavor nuance retention; and
      (z) original mouthfeel retention.

6. A method for producing the edible pizza food article of claim 1 consisting of the steps of:
   (a) applying a continuous layer of a first coating composition comprising:
      (i) from about 5 up to about 20% by weight of whey protein concentrate;
      (ii) from about 30 up to about 60% by weight of water;
      (iii) from about 0.4 up to about 20% by weight of methyl cellulose;
      (iv) from about 20 up to about 50% of an unsaturated edible oil selected from the group consisting of coconut oil, corn oil, olive oil and lard;
      (v) from about 0.2% up to about 1% by weight of an emulsifier; and
      (vi) from about 1 up to 8% of a starch,
      to a thermally conductive or non-conductive substantially horizontally planar solid surface thereby forming a first coating lamina having a substantially horizontally planar coating composition lamina surface;
   (b) applying a continuous layer of pizza dough to said first coating lamina thereby forming a first pizza dough lamina having a substantially horizontally planar pizza dough lamina surface;
   (c) applying a continuous layer of a second coating composition consisting of:
      (i) from about 5 up to about 20% by weight of whey protein concentrate;
      (ii) from about 30 up to about 60% by weight of water;
      (iii) from about 0.4 up to about 20% by weight of methyl cellulose;
      (iv) from about 20 up to about 50% of an unsaturated edible oil selected from the group consisting of coconut oil, corn oil, olive oil and lard;
      (v) from about 0.2% up to about 1% by weight of an emulsifier; and
      (vi) optionally, from about 1 up to 8% of a starch,
      to the pizza dough lamina surface thereby forming a second coating lamina having a substantially horizontally planar coating composition lamina surface;
   (d) applying at least one substantially continuous layer of a tomato sauce composition to substantially the entirety of said second coating lamina surface thereby forming a tomato sauce composition lamina having a substantially horizontally planar upper tomato sauce composition lamina surface;
   (e) applying at least one cheese composition to substantially the entirety of said upper tomato sauce composition lamina surface thereby forming a cheese composition lamina having a substantially horizontally planar cheese composition lamina surface; and
   (f) baking the product to completion,
   whereby said pizza food article has the properties subsequent to reheating of:
      (x) high shelf stability;
      (y) original flavor nuance retention; and
      (z) original mouthfeel retention.

7. A method for producing the edible pizza food particle of claim 1 consisting of the steps of:
   (a) applying a continuous layer of a first coating composition comprising:
      (i) from about 40 up to about 75% by weight of a starch;
      (ii) from about 5 up to about 20% by weight of methyl cellulose;
      (iii) from about 0.05 up to about 0.5% by weight of xanthan gum;
      (iv) from about 8% up to about 20% by weight of a salt composition; and (v) from 9 up to 20% by weight of a sugar, to a thermally conductive or non-conductive substantially horizontally planar solid surface thereby forming a first coating lamina having a substantially horizontally planar coating composition lamina surface;

(b) applying a continuous layer of pizza dough to said first coating lamina thereby forming a first pizza dough lamina having a substantially horizontally planar pizza dough lamina surface;

(c) applying a continuous layer of a second coating composition comprising:
   (i) from about 5 up to about 20% by weight of whey protein concentrate;
   (ii) from about 30 up to about 60% by weight of water;
   (iii) from about 0.4 up to about 20% by weight of methyl cellulose;
   (iv) from about 20 up to about 50% of an unsaturated edible oil selected from the group consisting of coconut oil, corn oil, olive oil and lard;
   (v) from about 0.2% up to about 1% by weight of an emulsifier; and
   (vi) optionally, from about 1 up to 8% of a starch, to the pizza dough lamina surface thereby forming a second coating lamina having a substantially horizontally planar coating composition lamina surface;

(d) applying at least one substantially continuous layer of a tomato sauce composition to substantially the entirety of said second coating lamina surface thereby forming a tomato sauce composition lamina having a substantially horizontally planar tomato sauce composition lamina surface;

(e) applying at least one cheese composition to substantially the entirety of said upper tomato sauce composition lamina surface thereby forming a cheese composition lamina having a substantially horizontally planar cheese composition lamina surface; and (f) baking the product to completion, whereby said pizza food article has the properties subsequent to reheating of:
   (x) high shelf stability;
   (y) original flavor nuance retention; and
   (z) original mouthfeel retention.

8. A method for producing the edible pizza food article of claim 1 consisting of the steps of:

(a) applying a continuous layer of a first coating composition comprising either:

I.
   (i) from about 5 up to about 20% by weight of whey protein concentrate;
   (ii) from about 30 up to about 60% by weight of water;
   (iii) from about 0.4 up to about 20% by weight of methyl cellulose;
   (iv) from about 20 up to about 50% of an unsaturated edible oil selected from the group consisting of coconut oil, corn oil, olive oil and lard;
   (v) from about 0.2% up to about 1% by weight of an emulsifier; and
   (vi) optionally, from about 1 up to 8% of a starch, or II.
   (i) from about 40 up to about 75% by weight of a starch;
   (ii) from about 5 up to about 20% by weight of methyl cellulose;
   (iii) from about 0.05 up to about 0.5% by weight of xanthan gum;
   (iv) from about 8% up to about 20% by weight of a salt composition; and
   (v) from about 9 up to about 20% by weight of a sugar, to a thermally conductive or non-conductive substantially horizontally planar solid surface thereby forming a first coating lamina having a substantially horizontally planar coating composition lamina surface;

(b) applying a continuous layer of pizza dough to said first coating lamina thereby forming a first pizza dough lamina having a substantially horizontally planar pizza dough lamina surface;

(c) applying a continuous layer of a second coating composition comprising:
   (i) from about 5 up to about 20% by weight of whey protein concentrate;
   (ii) from about 30 up to about 60% by weight of water;
   (iii) from about 0.4 up to about 20% by weight of methyl cellulose;
   (iv) from about 20 up to about 50% of an unsaturated edible oil selected from the group consisting of coconut oil, corn oil, olive oil and lard;
   (v) from about 0.2% up to about 1% by weight of an emulsifier; and
   (vi) optionally, from about 1 up to 8% of a starch, to the pizza dough lamina surface thereby forming a second coating lamina having a substantially horizontally planar coating composition lamina surface;

(d) applying at least one substantially continuous layer of a tomato sauce composition to substantially the entirety of said second coating lamina surface thereby forming a tomato sauce composition lamina having a substantially horizontally planar tomato sauce composition lamina surface;

(e) applying at least one cheese composition to substantially the entirety of said upper tomato sauce composition lamina surface thereby forming a cheese composition lamina having a substantially horizontally planar cheese composition lamina surface; and (f) baking the product to completion, whereby said pizza food article has the properties subsequent to reheating of:
   (x) high shelf stability;
   (y) original flavor nuance retention; and
   (z) original mouthfeel retention.

9. A method for producing the edible pizza food article of claim 1 consisting of the steps of:

(a) applying a continuous layer of a first coating composition comprising:
   (i) from about 5 up to about 20% by weight of whey protein concentrate;
   (ii) from about 30 up to about 60% by weight of water;
   (iii) from about 0.4 up to about 20% by weight of methyl cellulose;
   (iv) from about 20 up to about 50% of an unsaturated edible oil selected from the group consisting of coconut oil, corn oil, olive oil and lard;

(v) from about 0.2% up to about 1% by weight of an emulsifier; and (vi) optionally, from about 1 up to 8% of a starch, to a thermally conductive or non-conductive substantially horizontally planar surface thereby forming a first coating lamina having a substantially horizontally planar coating composition lamina surface;

(b) applying a continuous layer of pizza dough to said first coating lamina thereby forming a first pizza dough lamina having a substantially horizontally planar pizza dough lamina surface;

(c) applying at least one substantially continuous layer of a tomato sauce composition to substantially the entirety of said pizza dough lamina surface thereby forming a tomato sauce composition lamina having a substantially horizontally planar upper tomato sauce composition lamina surface;

(d) applying at least one cheese composition to substantially the entirety of said upper tomato sauce composition lamina surface thereby forming a cheese composition lamina having a substantially horizontally planar cheese composition lamina surface; and (e) applying a continuous layer of a second coating composition comprising:

(i) from about 5 up to about 20% by weight of whey protein concentrate;

(ii) from about 30 up to about 60% by weight of water;

(iii) from about 0.4 up to about 20% by weight of methyl cellulose;

(iv) from about 20 up to about 50% of an unsaturated edible oil selected from the group consisting of coconut oil, corn oil, olive oil and lard;

(v) from about 0.2% up to about 1% by weight of an emulsifier; and (vi) optionally, from about 1 up to 8% of a starch, to said horizontally planar cheese composition lamina surface thereby forming a second coating lamina having a substantially horizontally planar second coating composition lamina surface;

(f) baking the product to completion, whereby said pizza article has the properties subsequent to reheating of:

(x) high shelf stability;

(y) original flavor nuance retention; and (z) original mouthfeel retention.

10. A method for producing the edible pizza food article of claim 1 consisting of:

(a) applying a continuous layer of a first coating composition comprising:

(i) from about 5 up to about 20% by weight of whey protein concentrate;

(ii) from about 30 up to about 60% by weight of water;

(iii) from about 0.4 up to about 20% by weight of methyl cellulose;

(iv) from about 20 up to about 50% of an unsaturated edible oil selected from the group consisting of coconut oil, corn oil, olive oil and lard;

(v) from about 0.2% up to about 1% by weight of an emulsifier; and (vi) optionally, from about 1 up to 8% of a starch, to a thermally conductive or non-conductive substantially horizontally planar surface thereby forming a first coating lamina having a substantially horizontally planar coating composition lamina surface;

(b) applying a continuous layer of pizza dough to said first coating lamina thereby forming a first pizza dough lamina having a substantially horizontally planar pizza dough lamina surface;

(c) applying at least one substantially continuous layer of a tomato sauce composition to substantially the entirety of said pizza dough lamina surface thereby forming a tomato sauce composition lamina having a substantially horizontally planar upper tomato sauce composition lamina surface;

(d) applying at least one cheese composition to substantially the entirety of said upper tomato sauce composition lamina surface thereby forming a cheese composition lamina having a substantially horizontally planar cheese composition lamina surface; and (e) applying a condiment composition to said cheese coating lamina surface; and (f) baking the product to completion, whereby said pizza article has the properties subsequent to reheating of:

(x) high shelf stability;

(y) original flavor nuance retention; and (z) original mouthfeel retention.

11. A method for producing the edible pizza food article of claim 1 consisting of the steps of:

(a) applying a continuous layer of a first coating composition comprising:

(i) from about 5 up to about 20% by weight of whey protein concentrate;

(ii) from about 30 up to about 60% by weight of water;

(iii) from about 0.4 up to about 20% by weight of methyl cellulose;

(iv) from about 20 up to about 50% of an unsaturated edible oil selected from the group consisting of coconut oil, corn oil, olive oil and lard;

(v) from about 0.2% up to about 1% by weight of an emulsifier; and (vi) optionally, from about 1 up to 8% of a starch, to a thermally conductive or non-conductive substantially horizontally planar surface thereby forming a first coating lamina having a substantially horizontally planar coating composition lamina surface;

(b) applying a continuous layer of pizza dough to said first coating lamina thereby forming a first pizza dough lamina having a substantially horizontally planar pizza dough lamina surface;

(c) applying at least one substantially continuous layer of a tomato sauce composition to substantially the entirety of said pizza dough lamina surface thereby forming a tomato sauce composition lamina having a substantially horizontally planar upper tomato sauce composition lamina surface;

(d) applying a continuous layer of a second coating composition comprising:

(i) from about 5 up to about 20% by weight of whey protein concentrate;

(ii) from about 30 up to about 60% by weight of water;

(iii) from about 0.4 up to about 20% by weight of methyl cellulose;

(iv) from about 20 up to about 50% of an unsaturated edible oil selected from the group consisting of coconut oil, corn oil, olive oil and lard;

(v) from about 0.2% up to about 1% by weight of an emulsifier; and (vi) optionally, from about 1 up to 8% of a starch, to said tomato sauce composition lamina surface thereby forming a second coating lamina having a substantially horizontally planar second coating composition lamina surface;

(e) applying at least one cheese composition to substantially the entirety of said second coating composition lamina surface thereby forming a cheese composition lamina having a substantially horizontally planar cheese composition lamina surface; and (f) baking the product to completion, whereby said pizza article has the properties subsequent to reheating of:
(x) high shelf stability;
(y) original flavor nuance retention; and
(z) original mouthfeel retention.

12. A method for producing the edible pizza food article of claim 1 consisting of the steps of:

(a) applying a continuous layer of a first coating composition comprising:
  (i) from about 5 up to about 20% by weight of whey protein concentrate;
  (ii) from about 30 up to about 60% by weight of water;
  (iii) from about 0.4 up to about 20% by weight of methyl cellulose;
  (iv) from about 20 up to about 50% of an unsaturated edible oil selected from the group consisting of coconut oil, corn oil, olive oil and lard;
  (v) from about 0.2% up to about 1% by weight of an emulsifier; and
  (vi) optionally, from about 1 up to 8% of a starch,
to a thermally conductive or non-conductive substantially horizontally planar surface thereby forming a first coating lamina having a substantially horizontally planar coating composition lamina surface;

(b) applying a continuous layer of pizza dough to said first coating lamina thereby forming a first pizza dough lamina having a substantially horizontally planar pizza dough lamina surface;

(c) applying a continuous layer of a second coating composition comprising:
  (i) from about 5 up to about 20% by weight of whey protein concentrate;
  (ii) from about 30 up to about 60% by weight of water;
  (iii) from about 0.4 up to about 20% by weight of methyl cellulose;
  (iv) from about 20 up to about 50% of an unsaturated edible oil selected from the group consisting of coconut oil, corn oil, olive oil and lard;
  (v) from about 0.2% up to about 1% by weight of an emulsifier; and
  (vi) optionally, from about 1 up to 8% of a starch,
to said pizza dough lamina surface thereby forming a second coating lamina having a substantially horizontally planar second coating composition lamina surface;

(d) applying at least one substantially continuous layer of a tomato sauce composition to substantially the entirety of said second coating composition lamina surface thereby forming a tomato sauce composition lamina having a substantially horizontally planar upper tomato sauce composition lamina surface;

(e) applying a continuous layer of a third coating composition comprising:
  (i) from about 5 up to about 20% by weight of whey protein concentrate;
  (ii) from about 30 up to about 60% by weight of water;
  (iii) from about 0.4 up to about 20% by weight of methyl cellulose;
  (iv) from about 20 up to about 50% of an unsaturated edible oil selected from the group consisting of coconut oil, corn oil, olive oil and lard;
  (v) from about 0.2% up to about 1% by weight of an emulsifier; and
  (vi) optionally, from about 1 up to 8% of a starch,
to said tomato sauce composition lamina surface thereby forming a third coating lamina having a substantially horizontally planar third coating composition lamina surface;

(f) applying at least one cheese composition to substantially the entirety of said third coating composition lamina surface thereby forming a cheese composition lamina having a substantially horizontally planar cheese composition lamina surface; and (g) baking the product to completion, whereby said pizza article has the properties subsequent to reheating of:
(x) high shelf stability;
(y) original flavor nuance retention; and
(z) original mouthfeel retention.

13. A method for producing the edible pizza food article of claim 1 consisting of the steps of:

(a) applying a continuous layer of pizza dough to a thermally conductive or non-conductive substantially horizontally planar solid surface thereby forming a first pizza dough lamina having a substantially horizontally planar pizza dough lamina surface;

(b) applying a continuous layer of a first coating composition comprising:
  (i) from about 5 up to about 20% by weight of whey protein concentrate;
  (ii) from about 30 up to about 60% by weight of water;
  (iii) from about 0.4 up to about 20% by weight of methyl cellulose;
  (iv) from about 20 up to about 50% of an unsaturated edible oil selected from the group consisting of coconut oil, corn oil, olive oil and lard;
  (v) from about 0.2% up to about 1% by weight of an emulsifier; and
  (vi) optionally, from about 1 up to 8% of a starch,
to said pizza dough lamina surface thereby forming a first coating lamina having a substantially horizontally planar coating composition lamina surface;

(c) applying at least one substantially continuous layer of a tomato sauce composition to substantially the entirety of said pizza dough lamina surface thereby forming a tomato sauce composition lamina having a substantially horizontally planar upper tomato sauce composition lamina surface;

(d) applying at least one cheese composition to substantially the entirety of said upper tomato sauce composition lamina surface thereby forming a cheese composition lamina having a substantially horizontally planar cheese composition lamina surface; and (e) baking the product to completion, whereby said pizza article has the properties subsequent to reheating of:
(x) high shelf stability;
(y) original flavor nuance retention; and
(z) original mouthfeel retention.

14. A method for producing the edible pizza food article of claim 1 consisting of the steps of:
(a) applying a continuous layer of pizza dough to a thermally conductive or non-conductive substantially horizontally planar solid surface thereby forming a first pizza dough lamina having a substantially horizontally planar pizza dough lamina surface;
(b) applying a continuous layer of a first coating composition comprising:
  (i) from about 5 up to about 20% by weight of whey protein concentrate;
  (ii) from about 30 up to about 60% by weight of water;
  (iii) from about 0.4 up to about 20% by weight of methyl cellulose;
  (iv) from about 20 up to about 50% of an unsaturated edible oil selected from the group consisting of coconut oil, corn oil, olive oil and lard;
  (v) from about 0.2% up to about 1% by weight of an emulsifier; and
  (vi) optionally, from about 1 up to 8% of a starch, to said pizza dough lamina surface thereby forming a first coating lamina having a substantially horizontally planar coating composition lamina surface;
(c) applying at least one substantially continuous layer of a tomato sauce composition to substantially the entirety of said pizza dough lamina surface thereby forming a tomato sauce composition lamina having a substantially horizontally planar upper tomato sauce composition lamina surface;
(d) applying at least one cheese composition to substantially the entirety of said upper tomato sauce composition lamina surface thereby forming a cheese composition lamina having a substantially horizontally planar cheese composition lamina surface; and
(e) baking the product to completion,
whereby said pizza article has the properties subsequent to reheating of:
(x) high shelf stability;
(y) original flavor nuance retention; and
(z) original mouthfeel retention.

15. A method for producing the edible pizza food article of claim 1 consisting of the steps of:
(a) applying a continuous layer of pizza dough to a thermally conductive or non-conductive substantially horizontally planar solid surface thereby forming a first pizza dough lamina having a substantially horizontally planar pizza dough lamina surface;
(b) applying a continuous layer of a first coating composition comprising:
  (i) from about 40 up to about 75% by weight of a starch;
  (ii) from about 5 up to about 20% by weight of methyl cellulose;
  (iii) from about 0.05 up to about 0.5% by weight of xanthan gum;
  (iv) from about 8 up to about 20% by weight of a salt composition; and
  (v) from about 9 up to about 20% by weight of a sugar;
to said pizza dough lamina surface thereby forming a first coating lamina having a substantially horizontally planar coating composition lamina surface;
(c) applying at least one substantially continuous layer of a tomato sauce composition to substantially the entirety of said pizza dough lamina surface thereby forming a tomato sauce composition lamina having a substantially horizontally planar upper tomato sauce composition lamina surface;
(d) applying at least one cheese composition to substantially the entirety of said upper tomato sauce composition lamina surface thereby forming a cheese composition lamina having a substantially horizontally planar cheese composition lamina surface; and
(e) baking the product to completion,
whereby said pizza article has the properties subsequent to reheating of:
(x) high shelf stability;
(y) original flavor nuance retention; and
(z) original mouthfeel retention.

16. A method for producing the edible pizza food article of claim 1 consisting of the steps of:
(a) applying a continuous layer of pizza dough to a thermally conductive or non-conductive substantially horizontally planar solid surface thereby forming a first pizza dough lamina having a substantially horizontally planar pizza dough lamina surface;
(b) applying a continuous layer of a first coating composition comprising:
  (i) from about 5 up to about 20% by weight of whey protein concentrate;
  (ii) from about 30 up to about 60% by weight of water;
  (iii) from about 0.4 up to about 20% by weight of methyl cellulose;
  (iv) from about 20 up to about 50% of an unsaturated edible oil selected from the group consisting of coconut oil, corn oil, olive oil and lard;
  (v) from about 0.2% up to about 1% by weight of an emulsifier; and
  (vi) optionally, from about 1 up to 8% of a starch, to said pizza dough lamina surface thereby forming a first coating lamina having a substantially horizontally planar coating composition lamina surface;
(c) applying a continuous layer of a second coating composition comprising:
  (i) from about 5 up to about 20% by weight of whey protein concentrate;
  (ii) from about 30 up to about 60% by weight of water;
  (iii) from about 0.4 up to about 20% by weight of methyl cellulose;
  (iv) from about 20 up to about 50% of an unsaturated edible oil selected from the group consisting of coconut oil, corn oil, olive oil and lard;
  (v) from about 0.2% up to about 1% by weight of an emulsifier; and
  (vi) optionally, from about 1 up to 8% of a starch, to said pizza dough lamina surface thereby forming a second coating lamina having a substantially horizontally planar second coating composition lamina surface;

(d) applying a continuous layer of a second coating composition comprising:
  (i) from about 5 up to about 20% by weight of whey protein concentrate;
  (ii) from about 30 up to about 60% by weight of water;
  (iii) from about 0.4 up to about 20% by weight of methyl cellulose;
  (iv) from about 20 up to about 50% of an unsaturated edible oil selected from the group consisting of coconut oil, corn oil, olive oil and lard;
  (v) from about 0.2% up to about 1% by weight of an emulsifier; and
  (vi) optionally, from about 1 up to 8% of a starch, to said upper tomato sauce composition lamina surface thereby forming a second coating lamina having a substantially horizontally planar second coating composition lamina surface;
(e) applying at least one cheese composition substantially the entirety of said second coating composition lamina surface thereby forming a cheese composition lamina having a substantially horizontally planar cheese composition lamina surface; and
(f) baking the product to completion,
whereby said pizza article has the properties subsequent to reheating of:
  (x) high shelf stability;
  (y) original flavor nuance retention; and
  (z) original mouthfeel retention.

17. A method for producing the edible pizza dough food article of claim 1 consisting of the steps of:
  (a) applying a continuous layer of pizza dough to a thermally conductive or non-conductive substantially horizontally planar solid surface thereby forming a first pizza dough lamina having a substantially horizontally planar pizza dough lamina surface;
  (b) applying a continuous layer of a first coating composition comprising:
    (i) from about 5 up to about 20% by weight of whey protein concentrate;
    (ii) from about 30 up to about 60% by weight of water;
    (iii) from about 0.4 up to about 20% by weight of methyl cellulose;
    (iv) from about 20 up to about 50% of an unsaturated edible oil selected from the group consisting of coconut oil, corn oil, olive oil and lard;
    (v) from about 0.2% up to about 1% by weight of an emulsifier; and
    (vi) optionally, from about 1 up to 8% of a starch, to said pizza dough lamina surface thereby forming a first coating lamina having a substantially horizontally planar coating composition lamina surface;
  (c) applying at least one substantially continuous layer of a tomato sauce composition to substantially the entirety of said pizza dough lamina surface thereby forming a tomato sauce composition lamina having a substantially horizontally planar upper tomato sauce composition lamina surface;
  (d) applying at least one cheese composition to substantially the entirety of said upper tomato sauce composition lamina surface thereby forming a cheese composition lamina having a substantially horizontally planar cheese composition lamina surface; and
  (e) applying a condiment composition to said cheese composition lamina surface thereby forming a condiment composition lamina; and
  (f) baking the product to completion,
whereby said pizza article has the properties subsequent to reheating of:
  (x) high shelf stability;
  (y) original flavor nuance retention; and
  (z) original mouthfeel retention.

18. A method for producing the edible pizza food article of claim 1 consisting of the steps of:
  (a) applying a continuous layer of pizza dough to a thermally conductive or non-conductive substantially horizontally planar solid surface thereby forming a first pizza dough lamina having a substantially horizontally planar pizza dough lamina surface;
  (b) applying a continuous layer of a first coating composition comprising:
    (i) from about 5 up to about 20% by weight of whey protein concentrate;
    (ii) from about 30 up to about 60% by weight of water;
    (iii) from about 0.4 up to about 20% by weight of methyl cellulose;
    (iv) from about 20 up to about 50% of an unsaturated edible oil selected from the group consisting of coconut oil, corn oil, olive oil and lard;
    (v) from about 0.2% up to about 1% by weight of an emulsifier; and
    (vi) optionally, from about 1 up to 8% of a starch, to said pizza dough lamina surface thereby forming a first coating lamina having a substantially horizontally planar coating composition lamina surface;
  (c) applying at least one substantially continuous layer of a tomato sauce composition to substantially the entirety of said pizza dough lamina surface thereby forming a tomato sauce composition lamina having a substantially horizontally planar upper tomato sauce composition lamina surface;
  (d) applying at least one cheese composition to substantially the entirety of said upper tomato sauce composition lamina surface thereby forming a cheese composition lamina having a substantially horizontally planar cheese composition lamina surface; and
  (e) applying a condiment composition to said cheese composition lamina surface thereby forming a condiment composition lamina; and
  (f) applying a continuous layer of a third coating composition comprising:
    (i) from about 5 up to about 20% by weight of whey protein concentrate;
    (ii) from about 30 up to about 60% by weight of water;
    (iii) from about 0.4 up to about 20% by weight of methyl cellulose;
    (iv) from about 20 up to about 50% of an unsaturated edible oil selected from the group consisting of coconut oil, corn oil, olive oil and lard;
    (v) from about 0.2% up to about 1% by weight of an emulsifier; and
    (vi) optionally, from about 1 up to 8% of a starch, to said condiment lamina surface thereby forming a third coating lamina having a substantially horizontally planar third coating composition lamina surface; and (g) baking the product to completion, whereby said pizza article has the properties subsequent to reheating of:

(x) high shelf stability;

(y) original flavor nuance retention; and (z) original mouthfeel retention.

19. A method for producing the edible pizza food article of claim 1 consisting of the steps of:

(a) applying a continuous layer of pizza dough to a thermally conductive or non-conductive substantially horizontally planar solid surface thereby forming a first pizza dough lamina having a substantially horizontally planar pizza dough lamina surface;

(b) applying a continuous layer of a first coating composition comprising:

(i) from about 5 up to about 20% by weight of whey protein concentrate;

(ii) from about 30 up to about 60% by weight of water;

(iii) from about 0.4 up to about 20% by weight of methyl cellulose;

(iv) from about 20 up to about 50% of an unsaturated edible oil selected from the group consisting of coconut oil, corn oil, olive oil and lard;

(v) from about 0.2% up to about 1% by weight of an emulsifier; and (vi) optionally, from about 1 up to 8% of a starch, to said pizza dough lamina surface thereby forming a first coating lamina having a substantially horizontally planar coating composition lamina surface;

(c) applying a continuous layer of a second coating composition comprising:

(i) from about 5 up to about 20% by weight of whey protein concentrate;

(ii) from about 30 up to about 60% by weight of water;

(iii) from about 0.4 up to about 20% by weight of methyl cellulose;

(iv) from about 20 up to about 50% of an unsaturated edible oil selected from the group consisting of coconut oil, corn oil, olive oil and lard;

(v) from about 0.2% up to about 1% by weight of an emulsifier; and (vi) optionally, from about 1 up to 8% of a starch, to said pizza dough lamina surface thereby forming a second coating lamina having a substantially horizontally planar second coating composition lamina surface;

(d) applying a continuous layer of a third coating composition comprising:

(i) from about 5 up to about 20% by weight of whey protein concentrate;

(ii) from about 30 up to about 60% by weight of water;

(iii) from about 0.4 up to about 20% by weight of methyl cellulose;

(iv) from about 20 up to about 50% of an unsaturated edible oil selected from the group consisting of coconut oil, corn oil, olive oil and lard;

(v) from about 0.2% up to about 1% by weight of an emulsifier; and (vi) optionally, from about 1 up to 8% of a starch, to said upper tomato sauce composition lamina surface thereby forming a third coating lamina having a substantially horizontally planar third coating composition lamina surface;

(e) applying at least one cheese composition substantially to the entirety of said third coating composition lamina surface thereby forming a cheese composition lamina having a substantially horizontally planar cheese composition lamina surface;

(f) applying at least one condiment composition to said horizontally planar cheese composition lamina surface thereby forming a condiment composition lamina; and (g) baking the product to completion, said pizza article having the properties subsequent to reheating of:

(x) high shelf stability;

(y) original flavor nuance retention; and (z) original mouthfeel retention.

* * * * *